US008019121B2

(12) United States Patent
Marks et al.

(10) Patent No.: US 8,019,121 B2
(45) Date of Patent: Sep. 13, 2011

(54) METHOD AND SYSTEM FOR PROCESSING INTENSITY FROM INPUT DEVICES FOR INTERFACING WITH A COMPUTER PROGRAM

(75) Inventors: Richard L. Marks, Foster City, CA (US); Xiadong Mao, Foster City, CA (US); Gary M. Zalewski, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/581,034

(22) Filed: Oct. 16, 2009

(65) Prior Publication Data
US 2010/0033427 A1 Feb. 11, 2010

Related U.S. Application Data

(60) Division of application No. 11/429,414, filed on May 4, 2006, now Pat. No. 7,627,139, which is a continuation-in-part of application No. 10/207,677, filed on Jul. 27, 2002, now Pat. No. 7,102,615, and a continuation-in-part of application No. 10/650,409, filed on Aug. 27, 2003, now Pat. No. 7,613,310, and a continuation-in-part of application No. 10/663,236, filed on Sep. 15, 2003, and a continuation-in-part of application No. 10/759,782, filed on Jan. 16, 2004, now Pat. No. 7,623,115, and a continuation-in-part of application No. 10/820,469, filed on Apr. 7, 2004, and a continuation-in-part of application No. 11/301,673, filed on Dec. 12, 2005, now Pat. No. 7,646,372.

(51) Int. Cl.
*G06K 9/00* (2006.01)
(52) U.S. Cl. ........................ 382/103; 382/107
(58) Field of Classification Search .................. 382/103, 382/107
See application file for complete search history.

(56) References Cited

U.S. PATENT DOCUMENTS
4,787,051 A 11/1988 Olson ........................... 364/518
(Continued)

FOREIGN PATENT DOCUMENTS
EP 0835676 4/1998
(Continued)

OTHER PUBLICATIONS

Ephraim et al. "Speech Enhancement Using a Minimum Mean-Square Error Log-Spectral Amplitude Estimator", 1985, IEEE.
(Continued)

*Primary Examiner* — Tom Lu
(74) *Attorney, Agent, or Firm* — Martine Penilla & Gencarella, LLP

(57) ABSTRACT

A method and system for determining an intensity value of an interaction with a computer program is described. The method and device includes capturing an image of a capture zone, identifying an input object in the image, identifying an initial value of a parameter of the input object, capturing a second image of the capture zone, and identifying a second value of the parameter of the input object. The parameter identifies one or more of a shape, color, or brightness of the input object and is affected by human manipulation of the input object. The extent of change in the parameter is calculated, which is the difference between the second value and the first value. An activity input is provided to the computer program, the activity input including an intensity value representing the extent of change of the parameter. A method for detecting an intensity value from sound generating input objects, and a computer video game are also described.

13 Claims, 18 Drawing Sheets

U.S. PATENT DOCUMENTS

| | | | |
|---|---|---|---|
| 4,843,568 A | 6/1989 | Krueger et al. | 364/518 |
| 5,128,671 A | 7/1992 | Thomas, Jr. | 341/20 |
| 5,394,168 A | 2/1995 | Smith, III et al. | 345/156 |
| 5,440,326 A | 8/1995 | Quinn | |
| 5,473,701 A | 12/1995 | Cezanne et al. | 381/92 |
| 5,485,273 A | 1/1996 | Mark et al. | 356/350 |
| 5,528,265 A | 6/1996 | Harrison | 345/158 |
| 5,611,731 A | 3/1997 | Bouton et al. | 463/37 |
| 5,675,825 A | 10/1997 | Dreyer et al. | 395/800 |
| 5,704,839 A | 1/1998 | Michael et al. | |
| 5,846,086 A | 12/1998 | Bizzi et al. | 434/247 |
| 5,861,910 A | 1/1999 | McGarry et al. | 348/87 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 6,144,367 A | 11/2000 | Berstis | 345/158 |
| 6,157,368 A | 12/2000 | Fager | 345/156 |
| 6,375,572 B1 | 4/2002 | Masuyama et al. | 463/43 |
| 6,498,860 B1 | 12/2002 | Sasaki et al. | 382/103 |
| 6,533,420 B1 | 3/2003 | Eichenlaub | 353/7 |
| 6,587,573 B1 | 7/2003 | Stam et al. | 382/104 |
| 6,674,415 B2 | 1/2004 | Nakamura et al. | 345/32 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,766,036 B1 * | 7/2004 | Pryor | 382/103 |
| 6,772,057 B2 | 8/2004 | Breed et al. | 701/45 |
| 6,791,531 B1 | 9/2004 | Johnston et al. | 345/157 |
| 6,928,180 B2 | 8/2005 | Stam et al. | 382/104 |
| 6,990,639 B2 | 1/2006 | Wilson | 715/863 |
| 7,043,056 B2 | 5/2006 | Edwards et al. | 382/103 |
| 7,223,173 B2 | 5/2007 | Masuyama et al. | 463/36 |
| 7,263,462 B2 | 8/2007 | Funge et al. | 702/179 |
| 7,296,007 B1 | 11/2007 | Funge et al. | 706/47 |
| 7,352,359 B2 | 4/2008 | Zalewski et al. | 345/156 |
| 7,391,409 B2 | 6/2008 | Zalewski et al. | 345/156 |
| 7,436,887 B2 | 10/2008 | Yeredor et al. | 375/240 |
| 7,545,926 B2 | 6/2009 | Mao | 379/406.08 |
| 7,558,698 B2 | 7/2009 | Funge et al. | 702/179 |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,636,697 B1 | 12/2009 | Dobson et al. | 706/12 |
| 7,636,701 B2 | 12/2009 | Funge et al. | 706/47 |
| 7,697,700 B2 | 4/2010 | Mao | 381/94.3 |
| 7,721,231 B2 | 5/2010 | Wilson | 715/863 |
| 2002/0085097 A1 | 7/2002 | Colmenarez et al. | 348/211 |
| 2003/0022716 A1 | 1/2003 | Park et al. | 463/36 |
| 2004/0046736 A1 * | 3/2004 | Pryor et al. | 345/156 |
| 2004/0117815 A1 | 6/2004 | Kondo et al. | |
| 2004/0178576 A1 | 9/2004 | Hillis et al. | 273/148 |
| 2004/0212589 A1 | 10/2004 | Hall et al. | 345/156 |
| 2004/0227725 A1 | 11/2004 | Calarco et al. | 345/156 |
| 2005/0226431 A1 | 10/2005 | Mao | 381/61 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0252541 A1 | 11/2006 | Zalewski et al. | 463/156 |
| 2006/0256081 A1 | 11/2006 | Zalewski et al. | 345/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0061413 A1 | 3/2007 | Larsen et al. | 709/217 |
| 2007/0072675 A1 | 3/2007 | Hammano et al. | 463/42 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0091421 A1 | 4/2008 | Gustavsson | 704/233 |
| 2009/0010494 A1 | 1/2009 | Bechtel et al. | 382/104 |
| 2009/0016642 A1 | 1/2009 | Hart | 382/278 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |

FOREIGN PATENT DOCUMENTS

| | | |
|---|---|---|
| EP | 1098686 | 5/2003 |
| GB | 2398690 | 8/2004 |
| WO | WO 88/05942 | 8/1988 |
| WO | WO 98/48571 | 10/1998 |
| WO | WO 2008/056180 | 5/2008 |

OTHER PUBLICATIONS

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

Bolt, R.A., "Put-that-there": voice and gesture at the graphics interface, Computer Graphics, vol. 14, No. 3 (ACM SIGGRAPH Conference Proceedings) Jul. 1980, pp. 262-270.

DeWitt, Thomas and Edelstein, Phil "Pantomation: A System for Position Tracking", Proceedings of the $2^{nd}$ Symposium on Small Computers in the Arts, Oct. 1982, pp. 61-69.

* cited by examiner

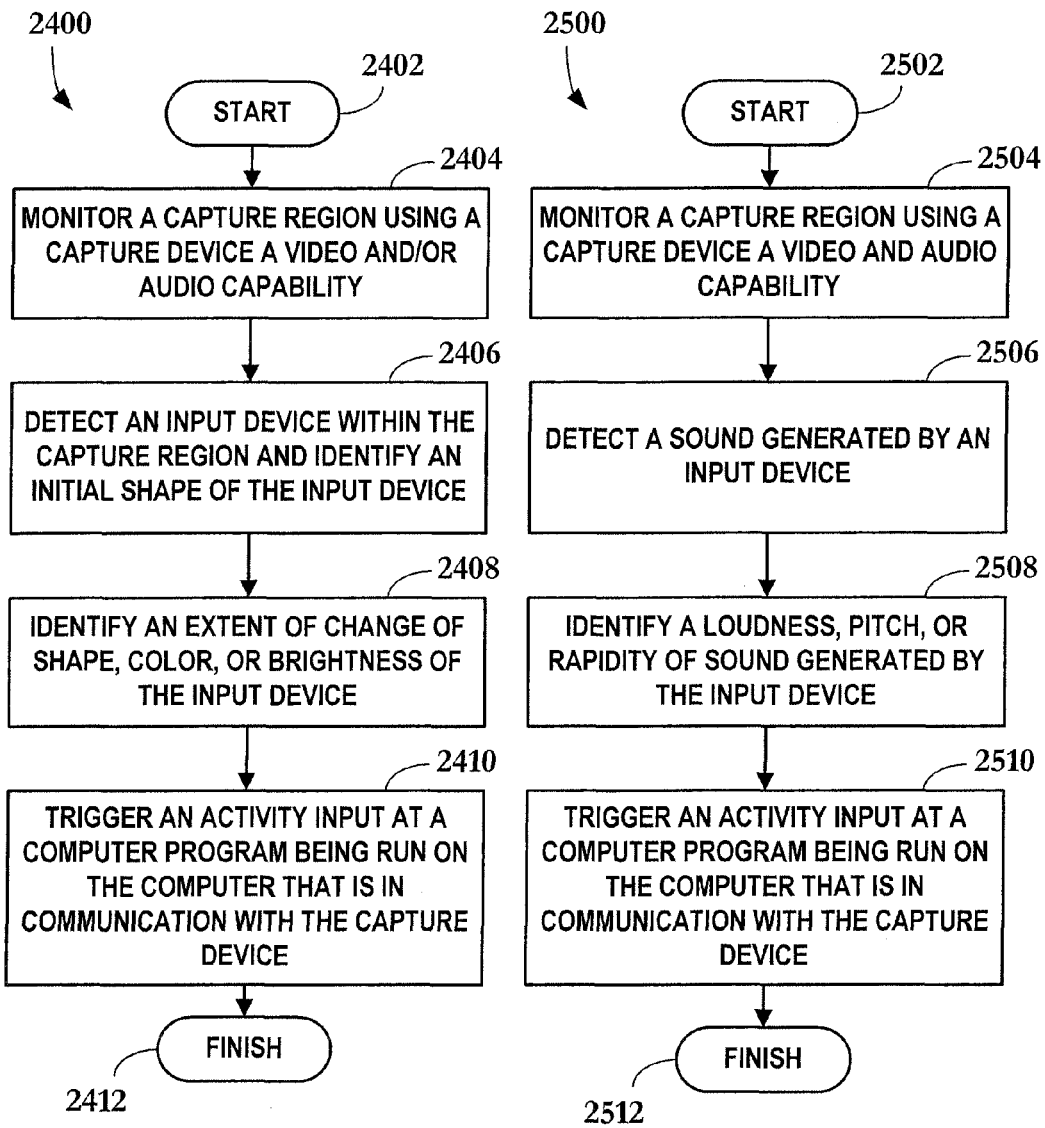

METHOD AND SYSTEM FOR PROCESSING INTENSITY FROM INPUT DEVICES FOR INTERFACING WITH A COMPUTER PROGRAM

CLAIM OF PRIORITY

This application is a Divisional Application of U.S. patent application Ser. No. 11/429,414, filed on May 4, 2006 now U.S. Pat. No. 7,627,139, entitled, "COMPUTER IMAGE AND AUDIO PROCESSING OF INTENSITY AND INPUT DEVICES FOR INTERFACING WITH A COMPUTER PROGRAM", which was a continuation in part (CIP) of: U.S. patent application Ser. No. 10/207,677, entitled, "MAN-MACHINE INTERFACE USING A DEFORMABLE DEVICE", filed on Jul. 27, 2002 now U.S. Pat. No. 7,102,615; U.S. patent application Ser. No. 10/650,409, entitled, "AUDIO INPUT SYSTEM", filed on Aug. 27, 2003 now U.S. Pat. No. 7,613,310; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004 now U.S. Pat. No. 7,623,115; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005 now U.S. Pat. No. 7,646,372; all of which are hereby incorporated by reference.

RELATED APPLICATIONS

This application is related to commonly-assigned, co-pending application Ser. No. 11/381,729, to Xiao Dong Mao, entitled ULTRA SMALL MICROPHONE ARRAY, filed the same day as the present application, the entire disclosures of which are incorporated herein by reference. This application is also related to commonly-assigned, application Ser. No. 11/381,728, to Xiao Dong Mao, entitled ECHO AND NOISE CANCELLATION, filed the same day as the present application, the entire disclosures of which are incorporated herein by reference. This application is also related to commonly-assigned, application Ser. No. 11/381,725, to Xiao Dong Mao, entitled "METHODS AND APPARATUS FOR TARGETED SOUND DETECTION", filed the same day as the present application, the entire disclosures of which are incorporated herein by reference. This application is also related to commonly-assigned, application Ser. No. 11/381,727, to Xiao Dong Mao, entitled "NOISE REMOVAL FOR ELECTRONIC DEVICE WITH FAR FIELD MICROPHONE ON CONSOLE", filed the same day as the present application, the entire disclosures of which are incorporated herein by reference. This application is also related to commonly-assigned, application Ser. No. 11/381,724, to Xiao Dong Mao, entitled "METHODS AND APPARATUS FOR TARGETED SOUND DETECTION AND CHARACTERIZATION", filed the same day as the present application, the entire disclosures of which are incorporated herein by reference. This application is also related to commonly-assigned, application Ser. No. 11/381,721, to Xiao Dong Mao, entitled "SELECTIVE SOUND SOURCE LISTENING IN CONJUNCTION WITH COMPUTER INTERACTIVE PROCESSING", filed the same day as the present application, the entire disclosures of which are incorporated herein by reference. This application is also related to commonly-assigned, application Ser. No. 11/418,988, to Xiao Dong Mao, entitled "METHODS AND APPARATUSES FOR ADJUSTING A LISTENING AREA FOR CAPTURING SOUNDS", filed the same day as the present application, the entire disclosures of which are incorporated herein by reference. This application is also related to commonly-assigned, application Ser. No. 11/418,989, to Xiao Dong Mao, entitled "METHODS AND APPARATUSES FOR CAPTURING AN AUDIO SIGNAL BASED ON VISUAL IMAGE", filed the same day as the present application, the entire disclosures of which are incorporated herein by reference. This application is also related to commonly-assigned, application Ser. No. 11/429,047, to Xiao Dong Mao, entitled "METHODS AND APPARATUSES FOR CAPTURING AN AUDIO SIGNAL BASED ON A LOCATION OF THE SIGNAL", filed the same day as the present application, the entire disclosures of which are incorporated herein by reference. This application is also related to commonly-assigned, application Ser. No. 11/429,133, to Richard Marks et al., entitled "SELECTIVE SOUND SOURCE LISTENING IN CONJUNCTION WITH COMPUTER INTERACTIVE PROCESSING", filed the same day as the present application, the entire disclosures of which are incorporated herein by reference.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms include the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, wherein a user can interactively play against or with other users over the Internet.

As game complexity continues to intrigue players, gaming software and hardware manufacturers have continued to innovate to enable additional interactivity. In reality, however, the way in which users interact with a game has not changed dramatically over the years. Commonly, users still play computer games using hand held controllers or interact with programs using mouse pointing devices.

In view of the foregoing, there is a need for methods and systems that enable more advanced user interactivity with game play.

SUMMARY

Broadly speaking, the present invention fills these needs by providing a method and video game using computer image and audio processing to determine an intensity amount when interfacing with a computer program.

It should be appreciated that the present invention can be implemented in numerous ways, including as a process, an apparatus, a system, a device, or a method. Several inventive embodiments of the present invention are described below.

In one embodiment, a method for determining an intensity value of an interaction with a computer program is provided. The method includes capturing an image of a capture zone, identifying an input object in the image, identifying an initial value of a parameter of the input object, capturing a second image of the capture zone, and identifying a second value of the parameter of the input object. The parameter identifies one or more of a shape, color, or brightness of the input object and may be affected by human manipulation of the input object. The extent of change in the parameter may be calculated, which is the difference between the second value and the first value. An activity input may be provided to the computer program, the activity input including an intensity value representing the extent of change of the parameter.

In another embodiment, a method for inputting an intensity value to a computer program is provided. The method includes capturing audio generated by an input object within the capture zone, identifying a in input parameter that identifies at least one of a loudness, rapidity, or pitch of the sound generated by the input device, and providing an activity input to the computer program. The computer program runs on a computer in communication with the means for capturing the audio. The activity input includes an intensity value that may be representative of the input parameter. The computer program simulates operation of a virtual version of the input object.

In yet another embodiment, a computer video game is provided. The computer video game includes an input object, a monitoring device, and a computer program executing on a computer. The input object may be configured for human manipulation. The monitor captures information comprising one of images or audio from a capture zone in a vicinity of the monitoring device. The computer program receives data representative of the information captured by the monitoring device and analyzes the data and calculates an intensity value representing an intensity of the human manipulation of the input object.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 24 and 25 show flowcharts for interfacing with a computer program using video capture and audio monitoring, respectively.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

The technology described herein can be used to identify an intensity value for an interaction with a computer program using audio and video capture and processing. In various embodiments, a computer or gaming system having a video camera and/or audio sensing capability can process image and audio data and identify various actions taking place in a zone of focus for the sensors. Such actions typically include manipulation of an object or creation of sounds, either by voice or by manipulating an object. Examples include pulling the trigger on a toy gun or moving or deforming an object. In addition to these techniques, the present technology further provides the additional functionality of sensing and determining an intensity amount associated with these actions. For example, how hard the trigger is pulled, to what extent is the object deformed, or how tightly is the baseball bat gripped. Using this additional parameter, video game manufacturers and others in fields relating to man-machine interactivity can greatly enhance the user experience. Specific examples of such are described below.

Also described herein are several embodiments of game controller enhancements to provide increased interactivity between a game controller and a game or other application. Such enhancements include providing a plurality of LEDs on the game controller which are viewable by a video capture and processing system, allowing the video game or other application to identify the location, movement, or orientation of the game controller with respect to a video capture device. Also described is a game controller having sound capture or sound or ultrasonic generation capability for accepting voice commands or communications with other users, and for providing communication between the controller and a base unit.

Figure 1:
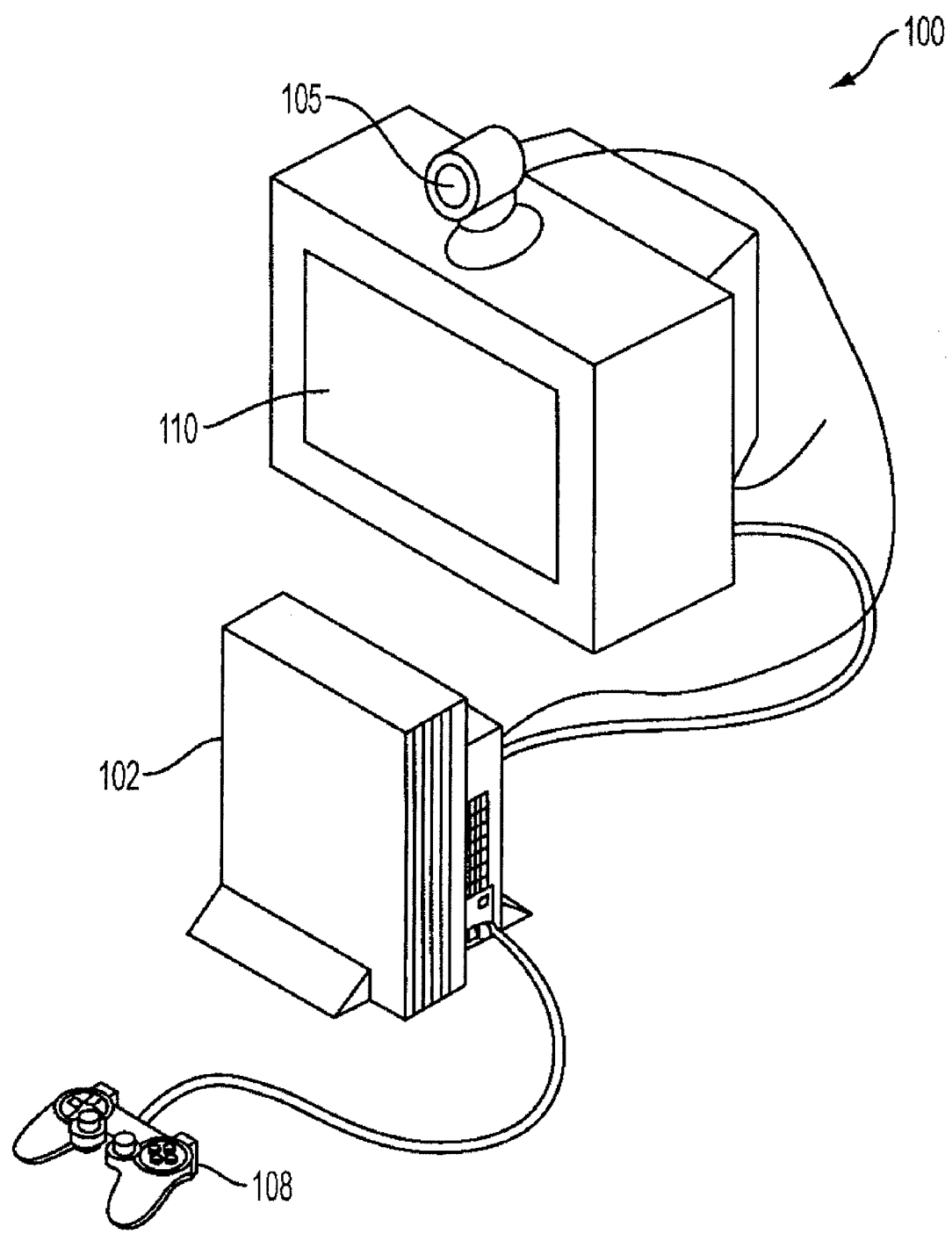
FIG. 1 illustrates an interactive game setup having an image capture device.

FIG. 1 illustrates an interactive game setup 100, in accordance with one embodiment of the present invention. The interactive game setup 100 includes a computer 102, also referred to herein as "console," that may be coupled to a display screen 110. An image capture device 105 may be placed on top of the display screen 110 and coupled to the computer 102. Computer 102 may be a gaming system console which allows users to play video games and interface with the video games through controllers 108. The image capture device 105 is shown placed on top of the display screen 110, but it should be understood that the image capture device 105 can be placed in any other proximate location that will allow it to capture images that are located about in front of the display screen 110. Techniques for capturing these movements and interactions can vary, but exemplary techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference.

In one embodiment, image capture device 105 can be as simple as a standard web cam or can include more advanced technology. Image capture device 105 may be capable of capturing images, digitizing the images, and communicating the image data back to the computer 102. In some embodiments, the image capture device will have logic integrated therein for performing the digitizing and another embodiment the image capture device 105 will simply transmit an analog video signal to the computer 102 for digitizing. In either case, the image capture device 105 may be capable of capturing either color or black and white images of any object located in front of the image capture device 105.

Figure 2:
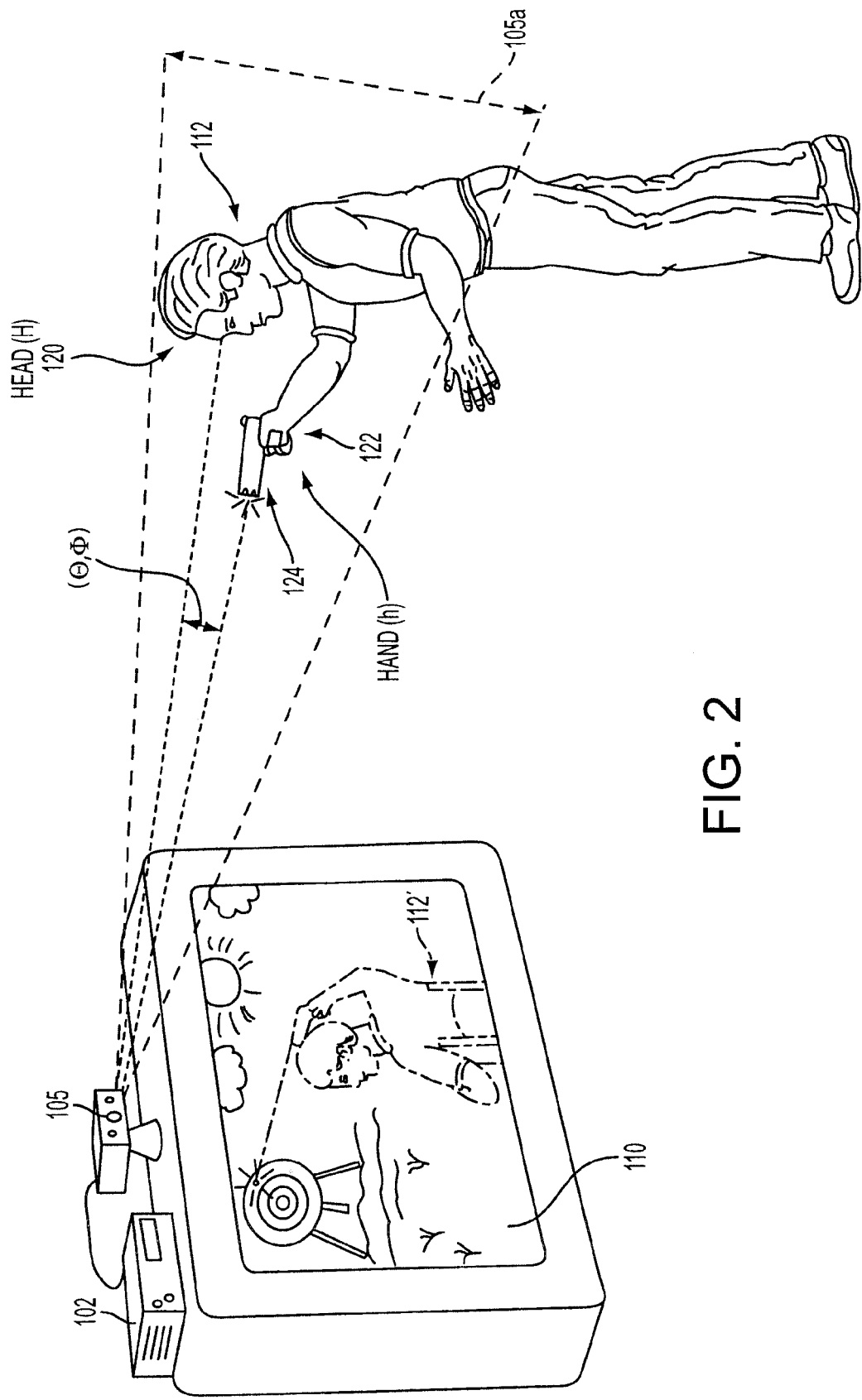
FIG. 2 illustrates a method for ascertaining a pointing direction of an object placed in front of an image capture device.

FIG. 2 illustrates an exemplary computer 102 for processing image data provided by the image capture device 105 to ascertain a pointing direction of an object placed in front of the image capture device 105. As shown, the computer 102 may be connected to the image capture device 105. The image capture device 105 may be designed to focus onto a capture region 105a. In this example, a person 112 may be intending to interact with a computer program being executed by the computer 102. The computer program, in this example, may be a video game which may be rendered and displayed by the display screen 110.

In the example shown, the video game is a target shooting game in which the person 112 wishes to aim at a target and earn points commensurate with his or her performance. As illustrated on the display screen 110, an image 112' of the person 112 may also be placed on the display screen 110 during game play. Alternatively, the person's image 112' may be omitted from the display screen, depending on the particular device under control or game being played. In this example, the user experience may be enhanced by illustrating an image 112' of the person 112 during the target shooting exercise to present more reality during game play. A feature of the target shooting game may be the ability for person 112 to point or direct an object 124 at particular interactive graphics on the display screen 110.

To achieve accurate pointing direction of the object 124, which in this case and for example purposes is a gun, the person 112 will hold the object 124 with his or her hand 122. The hand 122 will be directionally pointed toward the display screen 110. The image capture device 105 will at this point, analyze the digital image capture of the person 112 to determine the location of the person's 112 head 120, and the location of the person's 112 hand 122. As shown, the person's 112 hand may be extended in front of his body and the image capture device will identify the object 124 when examining the captured digital image. The captured digital image will also be examined by code executed at the computer 102 to ascertain the location of the person's 112 head 120. In one embodiment, head tracking may be completed with a combination of a template matching (for speed performance), coupled to a face detection code. The face detection code will essentially identify the location of the user's face by locating the user's eyes and other facial features. For additional information on head and face detection, reference may be made to U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003, which is herein incorporated by reference.

The object 124 will, in one embodiment, have an identifier which may be color or lights (e.g., light emitting diodes "LEDs") coupled to the object so that the program analyzing the captured digital image will easily identify the location of the object 124. Once the computer program has identified the location of the person's head 120 (H) and the location of the person's hand 122 (h), the computer program will perform computations to determine a relative angle from the image capture device position, and between the detected object 124, and the head 120.

As illustrated in FIG. 2, the relative position of the object 124 and the head 120 will be calculated relative to the image capture device 105. This will produce two angle parameters (theta θ and phi Φ). The azimuth angle θ will define the horizontal positioning between the head 120 and the object 124 along an X axis. The phi angle Φ will produce the altitude angle which is the relative angle between the height of the head 120 and the height of the hand 122. In one embodiment, an initial calibration operation may be performed before a gaming operation begins to calibrate the object's pointing location on the display screen 110. For instance, the user may be prompted to calibrate the pointing algorithm by having the user point the object 124 at a specific location on the display screen 110. Once the calibration has been completed, the computer 102 will be able to calculate the azimuth angle and the altitude angle (theta and phi) which define the relative positions of the person's head 120 and the person's hand 122, for each successive frame being captured by the image capture device 105. The relative positioning between the head and the hand may be calculated for each captured frame or may be captured every other frame, or after a number of frames are captured, depending on the accuracy required for the pointing operation. For example, if the game is a shooting gallery game, it would be important for the relative positioning of the head 120 and the hand 122 to be computed for each frame so that the person 112 will have accurate aiming and triggering capabilities when attempting to secure a good performing score in the video game contest.

Figure 3:
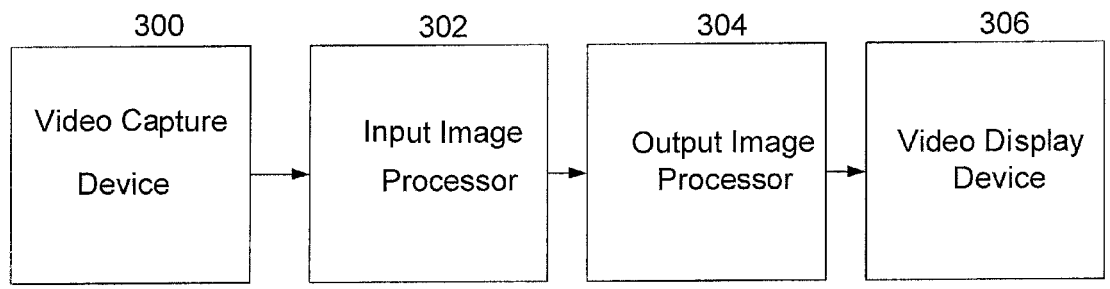
FIG. 3 is a block diagram of an exemplary user input system for interaction with an object on a graphical display.

FIG. 3 is a block diagram of an exemplary user input system for interaction with an object on a graphical display that can be used to implement embodiments of the present invention. As shown in FIG. 3, the user input system may be comprised of a video capture device 300, an input image processor 302, an output image processor 304, and a video display device 306. Video capture device 300 may be any device capable of capturing sequences of video images, and, in one embodiment, may be a digital video camera (such as a "web-cam"), or similar image capturing device.

The video capture device 300 may be configured to provide depth image. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Camera 300 can therefore provide the ability to capture and map the third-dimension in addition to normal two-dimensional video imagery. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor. However, unlike a conventional camera, a depth camera also captures the z-components of the scene, which represent the depth values for the scene. Since the depth values are typically assigned to the z-axis, the depth values are often referred to as z-values.

In operation, a z-value may be captured for each pixel of the scene. Each z-value represents a distance from the camera to a particular object in the scene corresponding to the related pixel. In addition, a maximum detection range may be defined beyond which depth values will not be detected. This maximum range plane can be utilized by the embodiments of the present invention to provide user defined object tracking. Thus, using a depth camera, each object can be tracked in three dimensions. As a result, a computer system of the embodiments of the present invention can utilize the z-values, along with the two-dimensional pixel data, to create an enhanced three-dimensional interactive environment for the user. For more information on depth analysis, reference may be made to U.S. patent application Ser. No. 10/448,614, entitled System and Method for Providing a Real-time three dimensional interactive environment, having a filing date of May 29, 2003, which is incorporated herein by reference.

Returning to FIG. 3, input image processor 302 translates the captured video images (which may be depth images) of the control object into signals that are delivered to an output image processor. In one embodiment, input image processor 302 may be programmed to isolate the control object from the background in the captured video image through the depth information and generate an output signal responsive to the position and/or movement of the control object. The output image processor 304 may be programmed to effect translational and/or rotational movement of an object on the video display device 306 in response to signals received from the input image processor 302.

These and additional aspects of the present invention may be implemented by one or more processors which execute software instructions. According to one embodiment of the present invention, a single processor executes both input image processing and output image processing. However, as shown in the figures and for ease of description, the processing operations are shown as being divided between an input image processor 302 and an output image processor 304. It should be noted that the invention is in no way to be interpreted as limited to any special processor configuration, such as more than one processor. The multiple processing blocks shown in FIG. 3 are shown only for convenience of description.

Figure 4:
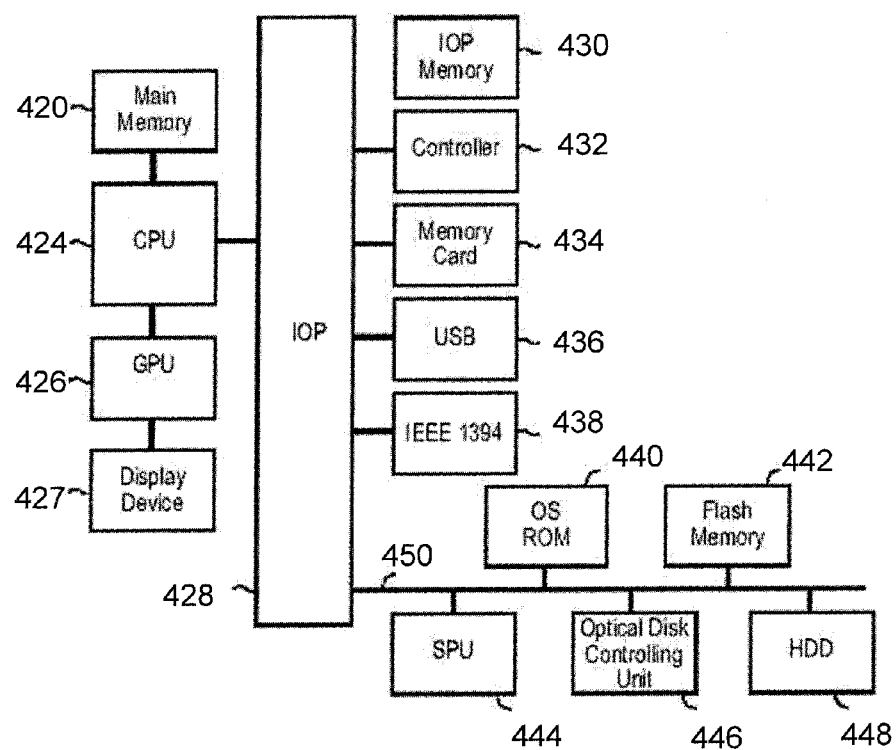
FIG. 4 is a simplified block diagram of a computer processing system configured to implement the embodiments of the invention described herein.

FIG. 4 is a simplified block diagram of a computer processing system configured to implement the embodiments of the invention described herein. The processing system may represent a computer-based entertainment system embodiment that includes central processing unit ("CPU") 424 coupled to main memory 420 and graphical processing unit ("GPU") 426. CPU 424 may also be coupled to Input/Output Processor ("IOP") Bus 428. In one embodiment, GPU 426 includes an internal buffer for fast processing of pixel based graphical data. Additionally, GPU 426 can include an output processing portion or functionality to convert the image data processed into standard television signals, for example NTSC or PAL, for transmission to display device 427 connected external to the entertainment system or elements thereof. Alternatively, data output signals can be provided to a display device other than a television monitor, such as a computer monitor, LCD (Liquid Crystal Display) device, or other type of display device.

IOP bus 428 couples CPU 424 to various input/output devices and other busses or device. IOP bus 428 may be connected to input/output processor memory 430, controller 432, memory card 434, Universal Serial Bus (USB) port 436, IEEE1394 (also known as a Firewire interface) port 438, and bus 450. Bus 450 couples several other system components to CPU 424, including operating system ("OS") ROM 440, flash memory 442, sound processing unit ("SPU") 444, optical disc controlling 4, and hard disk drive ("HDD") 448. In one aspect of this embodiment, the video capture device can be directly connected to IOP bus 428 for transmission therethrough to CPU 424; where, data from the video capture device can be used to change or update the values used to generate the graphics images in GPU 426. Moreover, embodiments of the present invention can use a variety of image processing configurations and techniques, such as those described in U.S. patent application Ser. No. 10/365,120 filed Feb. 11, 2003, and entitled METHOD AND APPARATUS FOR REAL TIME MOTION CAPTURE, which may be hereby incorporated by reference in its entirety. The computer processing system may run on a CELL™ processor.

Figure 5:
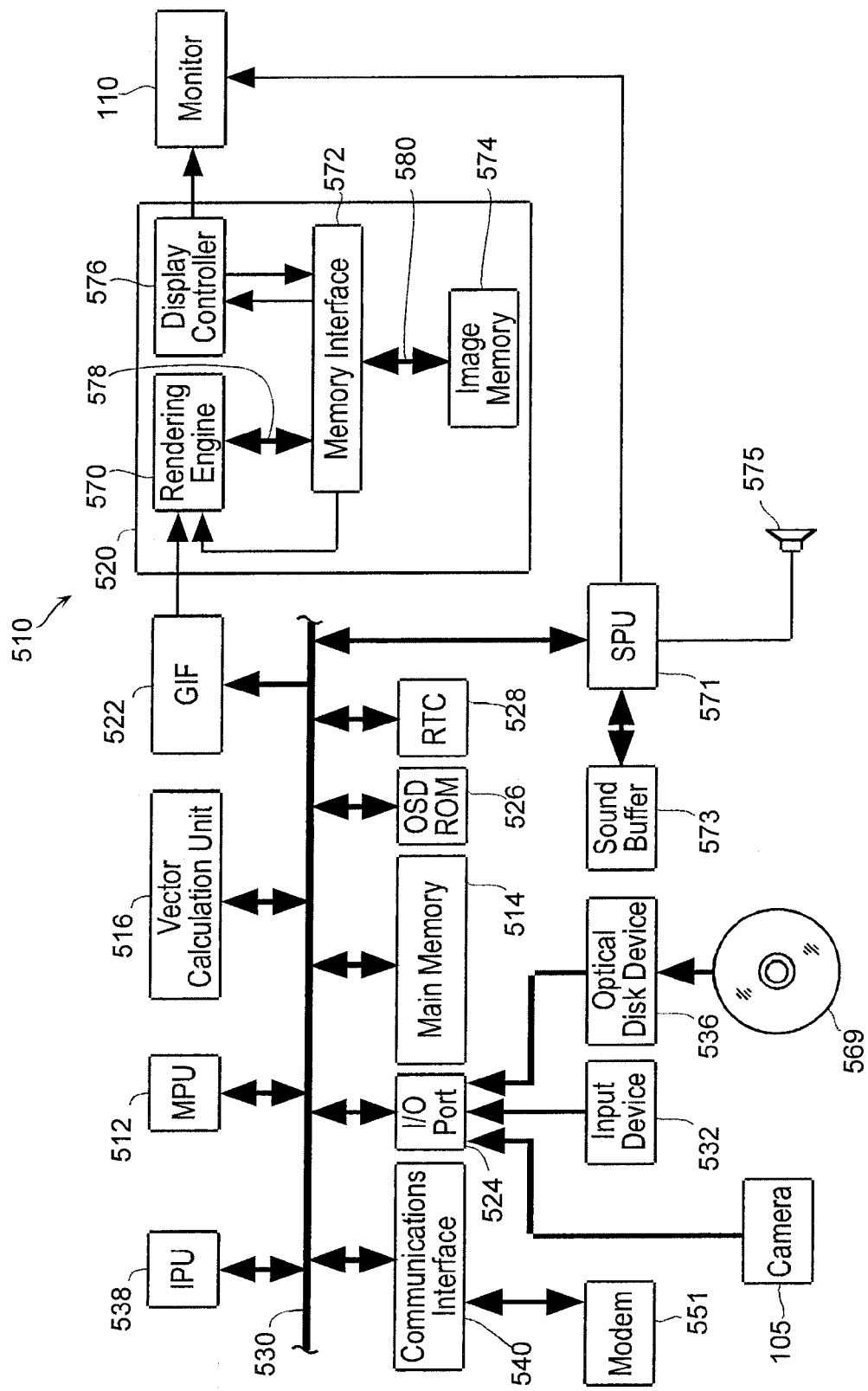
FIG. 5 is a block diagram of a configuration of the components of a video game console adapted for use with a manipulated object serving as an alternative input device.

FIG. 5 is a block diagram of a configuration of the components of a video game console adapted for use with a manipulated object serving as an alternative input device in accordance with one embodiment of the invention. Exemplary game console 510 may be equipped by a multiprocessor unit (MPU) 512 for control of overall console 510, main memory 514 which may be used for various program operations and for storage of data, vector calculation unit 516 for performing floating point vector calculations necessary for geometry processing, image processor 520 for generating data based on controls from MPU 512, and for outputting video signals to monitor 110 (for example a CRT), a graphics interface (GIF) 522 for carrying out mediation and the like over a transmission bus between MPU 512 or vector calculation unit 516 and image processor 520, input/output port 524 for facilitating reception and transmission of a data to and from peripheral devices, internal OSD functional ROM (OSDROM) 526 constituted by, for example, a flash memory, for performing control of a kernel or the like, and real time clock 528 having calendar and timer functions.

Main memory 514, vector calculation unit 516, GIF 522, OSDROM 526, real time clock (RTC) 528 and input/output port 524 are connected to MPU 512 over data bus 530. Also connected to BUS 530 may be image processing unit 538 which is a processor for expanding compressed moving images and texture images, thereby developing the image data. For example, the image processing unit 538 can serve functions for decoding and development of bit streams according to the MPEG2 or MPEG4 standard formats, macroblock decoding, performing inverse discrete cosine transformations, color space conversion, vector quantization and the like.

A sound system may be constituted by sound processing unit SPU 571 for generating musical or other sound effects on the basis of instructions from MPU 512, sound buffer 573 into which waveform data may be recorded by SPU 571, and speaker 575 for outputting the musical or other sound effects generated by SPU 571. It should be understood that speaker 575 may be incorporated as part of monitor 110 or may be provided as a separate audio line-out connection attached to external speaker 575.

Communications interface 540 may also be provided, connected to BUS 530, which is an interface having functions of input/output of digital data, and for input of digital contents according to the present invention. For example, through communications interface 540, user input data may be transmitted to, and status data received from, a server terminal on a network in order to accommodate on-line video gaming applications. Input device 532 (also known as a controller) for input of data (e.g. key input data or coordinate data) with respect to the console 510 optical disk device 536 for reproduction of the contents of optical disk 569, for example a CD-ROM or the like on which various programs and data (i.e. data concerning objects, texture data and the like), are connected to input/output port 524.

The present invention further includes digital video camera 105 which may be connected to input/output port 524. Input/output port 524 may be embodied by one or more input interfaces, including serial and USB interfaces, wherein digital video camera 190 may advantageously make use of the USB input or any other conventional interface appropriate for use with camera 105.

The above-mentioned image processor 520 includes a rendering engine 570, interface 572, image memory 574 and a display control device 576 (e.g. a programmable CRT controller, or the like). The rendering engine 570 executes operations for rendering of predetermined image data in the image memory, through memory interface 572, and in correspondence with rendering commands which are supplied from MPU 512. The rendering engine 570 has the capability of rendering, in real time, image data of 320×240 pixels or 640×480 pixels, conforming to, for example, NTSC or PAL standards, and more specifically, at a rate greater than ten to several tens of times per interval of from 1/60 to 1/30 of a second.

BUS 578 may be connected between memory interface 572 and the rendering engine 570, and a second BUS 580 may be connected between memory interface 572 and the image memory 574. First BUS 578 and second BUS 580, respectively, have a bit width of, for example 128 bits, and the rendering engine 570 may be capable of executing high speed rendering processing with respect to the image memory. Image memory 574 employs a unified memory structure in which, for example, a texture rendering region and a display rendering region, can be set in a uniform area.

Display controller 576 may be structured so as to write the texture data which has been retrieved from optical disk 569 through optical disk device 536, or texture data which has been created on main memory 514, to the texture rendering region of image memory 574, via memory interface 572. Image data which has been rendered in the display rendering region of image memory 174 may be read out via memory interface 572, outputting the same to monitor 110 whereby it may be displayed on a screen thereof.

Figure 6:
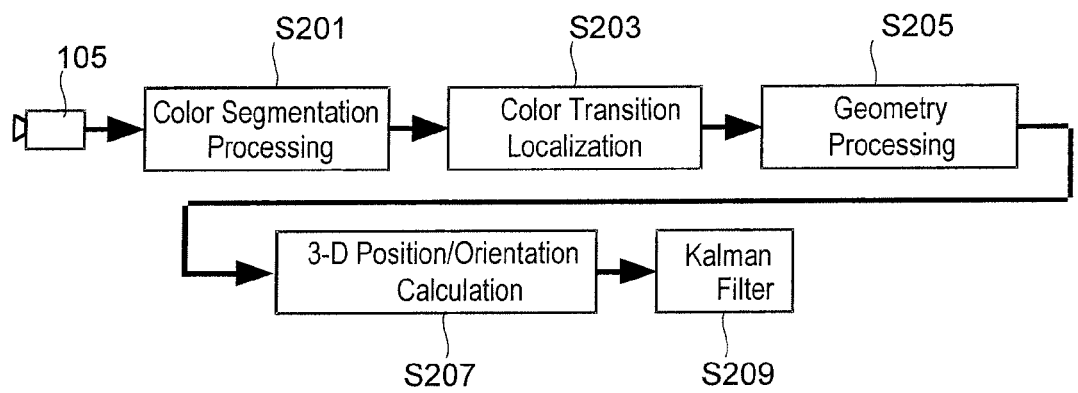
FIG. 6 is a block diagram showing the functional blocks used to track and discriminate a pixel group corresponding to the user input device as it is being manipulated by the user.

FIG. 6 is a block diagram showing the functional blocks used to track and discriminate a pixel group corresponding to the user input device as it is being manipulated by the user in accordance with one embodiment of the invention. It should be understood that the functions depicted by the blocks are implemented by software which may be executed by the MPU 512 in game console 510 of FIG. 5. Moreover, not all of the functions indicted by the blocks in FIG. 6 are used for each embodiment.

Initially, the pixel data input from the camera may be supplied to game console 510 through input/output port interface 524, enabling the following processes to be performed thereon. First, as each pixel of the image is sampled, for example, on a raster basis, a color segmentation processing step S201 may be performed, whereby the color of each pixel is determined and the image is divided into various two-dimensional segments of different colors. Next, for certain embodiments, a color transition localization step S203 may be performed, whereby regions where segments of different colors adjoin are more specifically determined, thereby defining the locations of the image in which distinct color transitions occur. Then, a step for geometry processing S205 may be performed which, depending on the embodiment, comprises either an edge detection process or performing calculations for area statistics, to thereby define in algebraic or geometric terms the lines, curves and/or polygons corresponding to the edges of the object of interest.

The three-dimensional position and orientation of the object are calculated in step S207, according to algorithms which are to be described in association with the subsequent descriptions of preferred embodiments of the present invention. The data of three-dimensional position and orientation also undergoes a processing step S209 for Kalman filtering to improve performance. Such processing may be performed to estimate where the object is going to be at a point in time, and to reject spurious measurements that could not be possible, and therefore are considered to lie outside the true data set. Another reason for Kalman filtering is that the camera 105 produces images at 30 Hz, whereas the typical display runs at 60 Hz, so Kalman filtering fills the gaps in the data used for controlling action in the game program. Smoothing of discrete data via Kalman filtering is well known in the field of computer vision and hence will not be elaborated on further.

Figure 7:
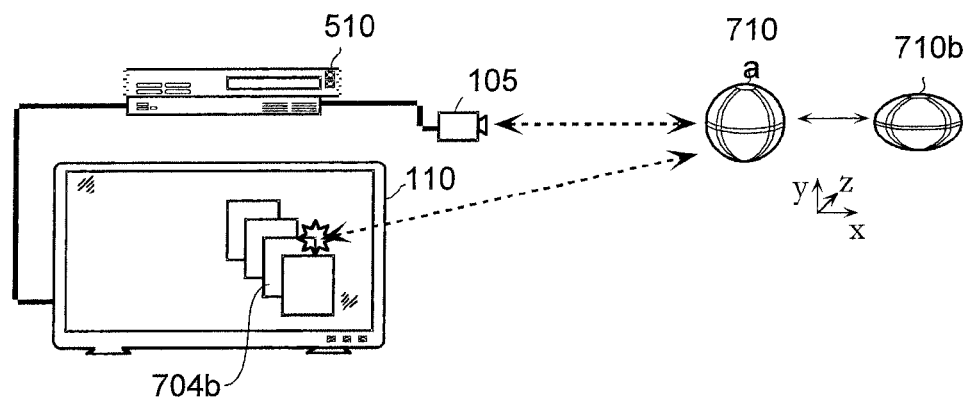
FIG. 7 is a schematic diagram of an exemplary embodiment of a deformable user input device.

FIG. 7 is a schematic diagram of an exemplary embodiment of a deformable user deformable object 710, which can exist in a relaxed state 710A or a depressed state 710B, according to the force applied to the deformable device by a user. Thus, deformable object 710 may be in the form of a collapsible ball. More generally, any type of deformable object can be tracked by the visual tracking system described herein. It should be appreciated that in this embodiment, the area of deformable object 710 as seen by video digital camera 105 remains relatively constant. Thus, in addition to capturing X and Y planar movements of deformable device 310, digital video camera 190 can also capture movement in the Z direction. The Z direction can be used to pull a file, such as file 304B forward or backwards, i.e., in a depth wise fashion as illustrated on monitor 110. Additionally, displayed objects that have been grabbed by deformable object 710 scan be made to appear smaller or larger, depending on the direction along the Z axis that deformable object 710 is moved. For example, if deformable object 710 is brought closer to camera 105 the displayed object will be made to appear larger while if deformable object 710 is moved away from camera 105 the displayed object will appear to be smaller on monitor 110, in one embodiment. One skilled in the art will appreciate that the displayed object can be made to change its size and location by a combination of movement if the X, Y and Z directions. Here an angle, theta ($\theta$), may be used to determine the movement in three dimensional space. One skilled in the art will appreciate that theta is an angle in the direction of the view plane of camera 190.

Still referring to FIG. 7, the camera captures the position of deformable object 710. The positional information may be communicated to game console 510. The positional information may be processed by game console 510, as described above with reference to FIGS. 1-3. As the aspect ratio or relative position of the deformable device changes, the processing translates the movement to an object being displayed on monitor 110. It should be appreciated that an audio signal can be generated upon the change in aspect ratio of the deformable device in one embodiment of the invention. Additionally, a passive button-press signal can be included in the deformable device. Accordingly, the user would perceive a clicking experience even if the clicking noise is not sensed by the computing system.

In one embodiment, the x, y, z, $\theta$, and squeeze parameters are determined through the analysis of the pixels in the image. It should be appreciated that the pixels in the image are part of the object, i.e., deformable device, being tracked. In particular, X is proportional to the horizontal centroid of the pixels in the image. Y is proportional to the vertical centroid of the pixels in the image. Z is inversely proportional to the square root of either the area of the pixels or the principle second moment (producing different accuracy/robustness behavior). Theta ($\theta$) corresponds to the rotation angle of the principle second moment. Squeeze parameters, such as squeeze amount, i.e., amount of deformation or change in an aspect ratio, is proportional to the square root of the principle second moment divided by the square root of the minimal second moment. Each of the above mentioned parameters can be computed from a single pass through the image. Thus, the implementation described herein is very fast and less sensitive to noise, i.e., visual error, than other commonly used metrics.

Figure 8:
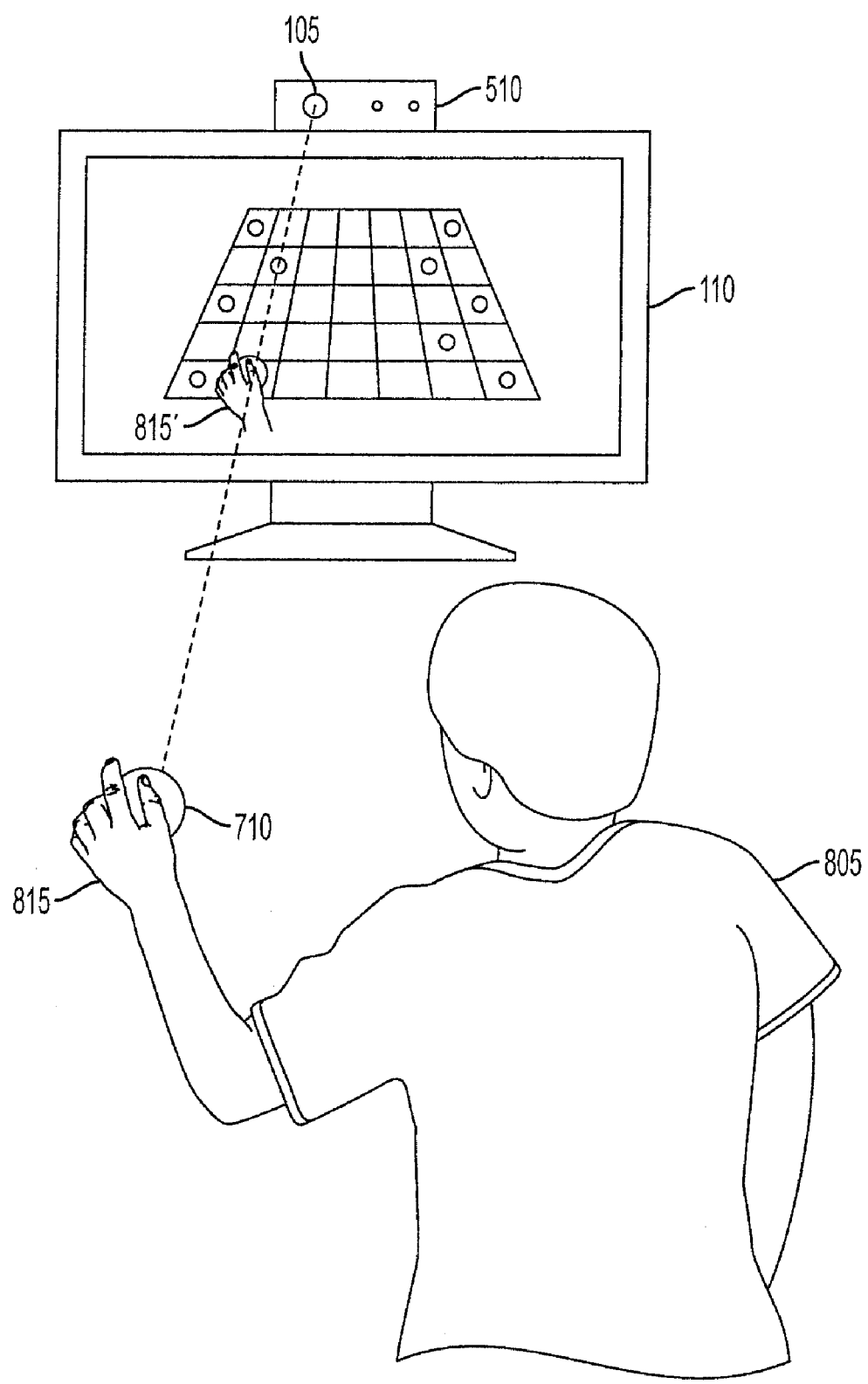
FIG. 8 shows an exemplary application in which a user is manipulating deformable object.

FIG. 8 shows an exemplary application in which a user 805 is manipulating deformable object 710. Deformable object 710 may be squeezed by hand 815 of user 805. Camera 105 of console 510 identifies that object 710 is deformed. A graphical representation of hand 815' picks up checker 817 on virtual checkerboard 820. Thereafter movement of deformable object 710 can be translated into movement of the graphical representation of hand 815'. To release checker 817, user 805 relaxes hand 815, thereby allowing deformable object 710 to return to its natural shape.

Figure 9:
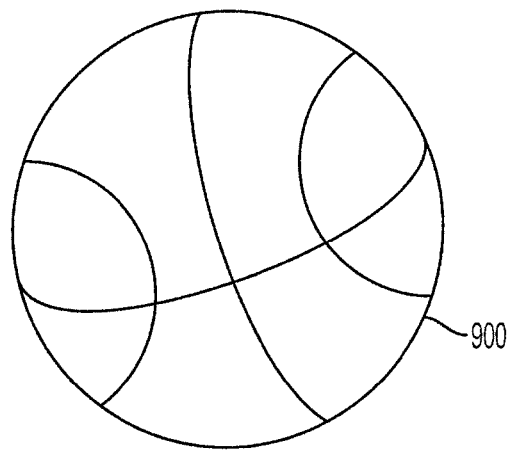
FIG. 9 shows an exemplary deformable object 900 in the form of a basketball

FIG. 9 shows an exemplary deformable object 900 in the form of a basketball. In one embodiment, deformable object 900 includes means causing it to illuminate when it is deformed. In another embodiment, deformable object 900 may be formed form a material that changes color when deformed. Color changing materials are known, and typically have a stress-sensitive fluorescent dye embedded in a translucent polymer matrix. In one embodiment, deformable object 710 may be made of a translucent foam rubber material having a shell of a color changing material.

Figure 10:
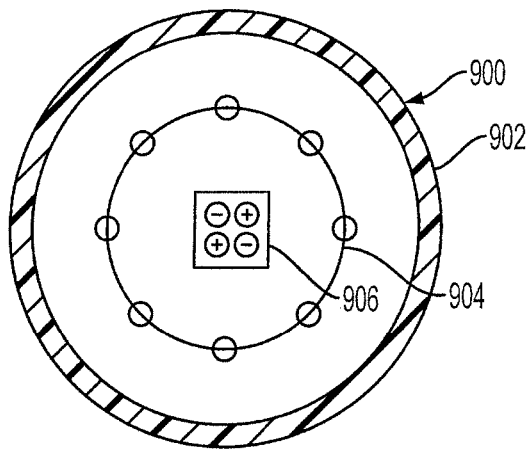
FIG. 10 shows deformable object having a light emitting diode layer (LED) beneath an outer layer.

FIG. 10 shows deformable object 900 having a light emitting diode layer (LED) 904 beneath outer layer 902. Batteries 906 are placed inside deformable object 900. LED layer 904 may comprise an LED blanket which lights up when deformed. In one embodiment, the more the object is deformed, the brighter the illumination. In another embodiment, the color of the illumination varies with the intensity of deformation. In one embodiment, the illumination only occurs in the portions of the object that are deformed. In a different embodiment, the entire object illuminates when deformed.

The amount of deformation may be sensed by the illuminating material itself. For example, the material may be formed of multiple conducting layers that come into contact when the material is deformed, the contact closing a circuit. In one embodiment, only the region being deformed is illuminated. In another embodiment, the amount of deformation is sensed by a distinct strain gauge circuit, which may be disposed on layer 904 of deformable object 900. In this case, deformation of the object causes the entire object to illuminate, with increasing brightness and/or color change in response to increasing deformation.

Figure 11:
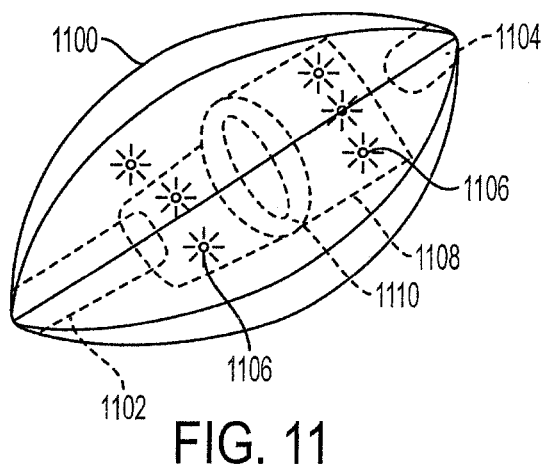
FIG. 11 shows an exemplary deformable object in the shape of a football.

FIG. 11 shows an exemplary deformable object in the shape of a football 1100. Because of the football's shape, determining the extent of deformation by measuring the aspect ratio of the imaged deformed object may not be reliable. Therefore, instead of relying on the aspect ratio, football 1100 has a circuit disposed on layer 1108. Layer 1108 includes a deformation sensor 1110 and a plurality of illuminators 1106. Illuminators 1106 may be illuminating diodes, etc. In addition, football 1100 has a battery compartment 1102 and a balance weight 1104 to balance football 1100. Because of the low voltage and current requirements of illuminators 1106, battery compartment 1102 may be quite small, e.g., the size for one or 2 size "AAA" batteries would be sufficient. The remainder of the volume within football 1100 may be filled with soft foam rubber, allowing football 1100 to be readily squeezed.

When football 1100 is squeezed, it deformation sensor 1110 detects the extent of deformation of football 1100 and generates illumination in response using illuminators 1106. For example, the brightness of the illumination increases with increasing deformation, or the color of the illumination changes with increasing deformation. Changes in color can be achieved by illuminating different colored LEDs. For example, at a low amount of deformation, green LEDs would illuminate. At increased amount of deformation, yellow, then red, then purple, then blue LEDs would illuminate. Thus a range of deformation amounts may be detected and then portrayed by changing the color of the illumination.

Camera 105 (FIG. 1) can detect the change in color of football 1100 and respond accordingly. For example, a virtual player portrayed on screen 110 can squeeze his virtual football in a manner consistent with the amount of deformation of football 1100.

Figure 12:
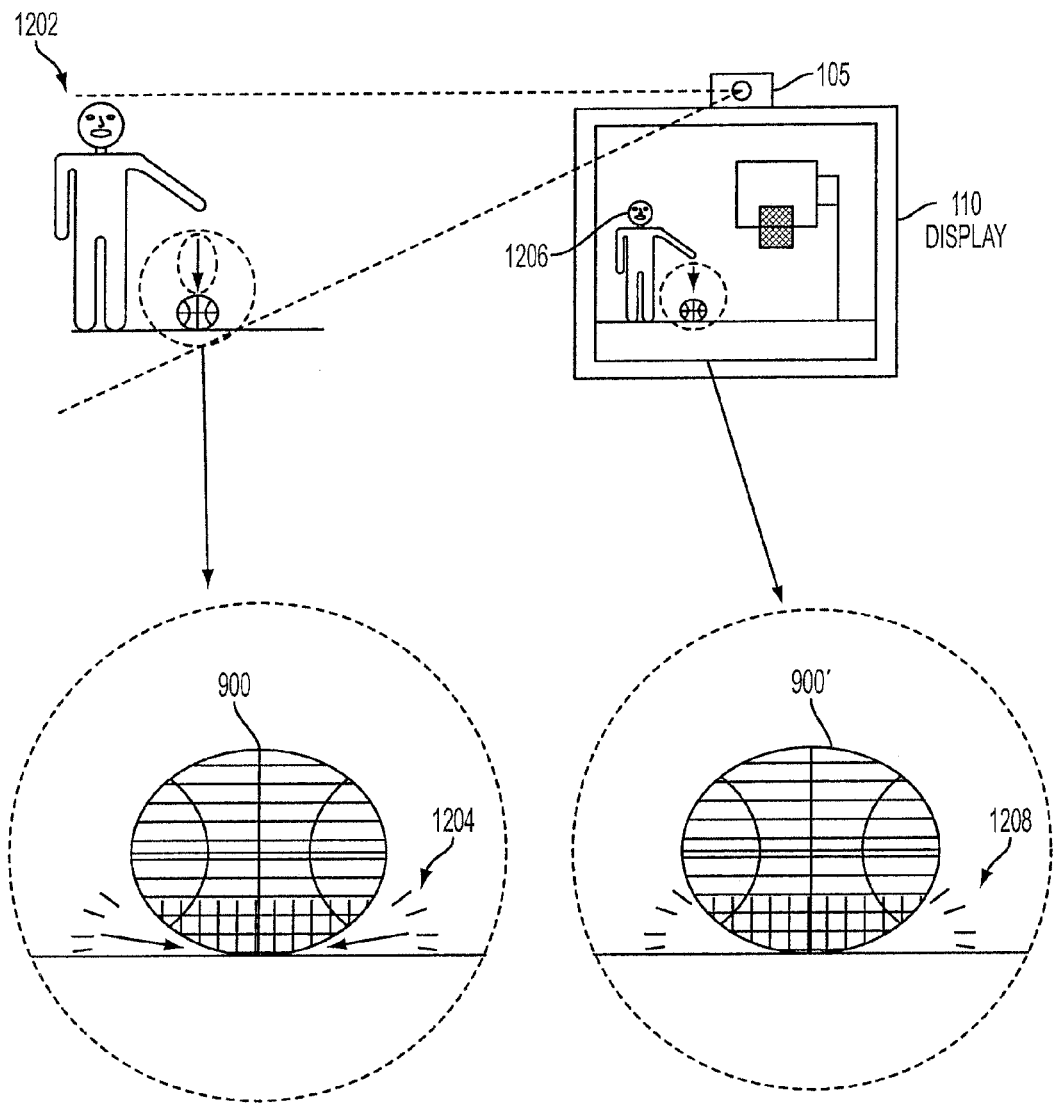
FIG. 12 shows an exemplary application for deformable object in which the deformable object in the form of a basketball in use by a user.

FIG. 12 shows an exemplary application for deformable object 900 in which deformable object 900 in the form of a basketball in use by user 1202. User 1202 is dribbling the basketball, which action may be received and interpreted by camera 105. An image of a virtual ball player 1206 may be presented on screen 110. The action of virtual ball player 1206 may be synchronized with the action of user 1202. At each bounce of deformable object 900, the deformed portions of the ball are illuminated as shown at 1204, wherein the shaded areas represent increased illumination. Virtual player 1206 bounces virtual ball 900' which also "illuminates" or changes color as shown at 1208.

Figure 13:
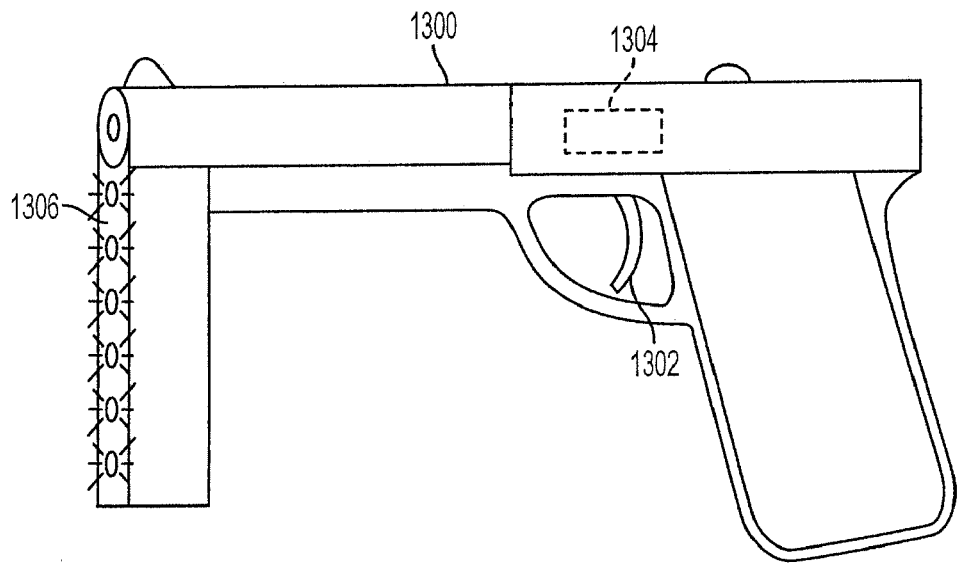
FIG. 13 shows a toy gun having a trigger and a trigger sensor.

FIG. 13 shows a toy gun 1300 having a trigger 1302 and trigger sensor 1304. Trigger sensor 1304 can detect the intensity with which trigger 1302 is squeezed. The intensity can be measured, for example, using a strain gauge or other known means, such as potentiometer and spring. As the intensity of squeezing increases, illuminators 1306 increases in number or brightness and/or changes colors. One possible use may be to change from a single shot mode to a repeating or "machine gun" action mode when trigger 1302 is squeezed to a great amount.

Figure 14:
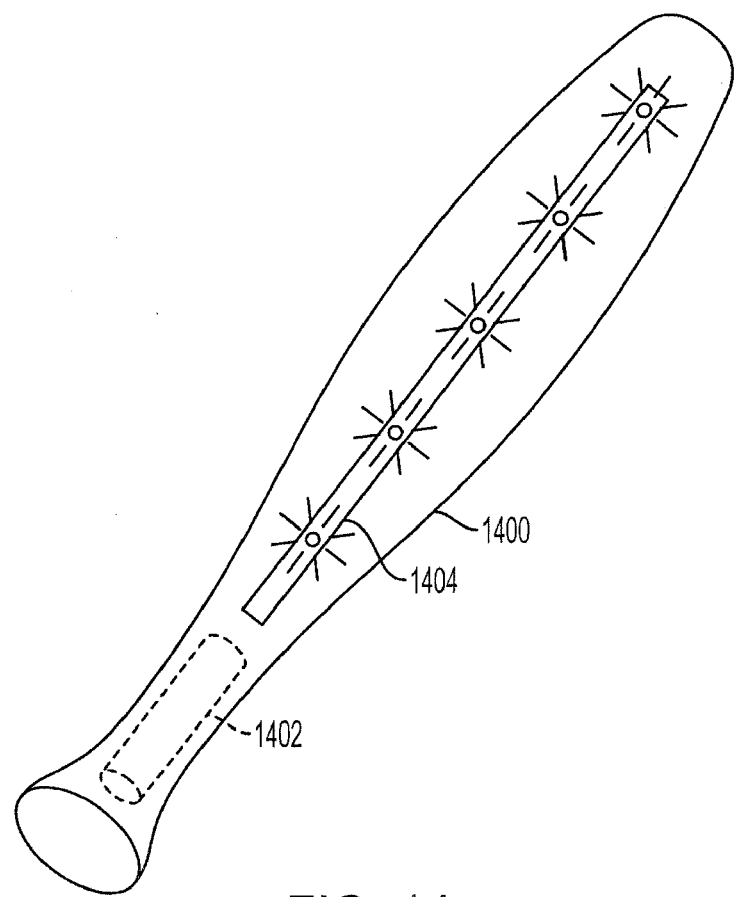
FIG. 14 shows a toy baseball bat.

FIG. 14 shows a toy baseball bat 1400 which may be made of translucent soft plastic or translucent foam rubber. Baseball bat 1400 includes deformation sensors 1402 at the grip and a illuminators 1404 along a length of the bat. As the user increases his or her grip on bat 1400, illuminators 1404 increase in number or brightness and/or changes colors.

Referring back to FIG. 7, console 510 may be able to sense an extent of deformation by measuring a percent change in aspect ratio of deformable object 710. However, in the case where deformable object 710 exhibits a change in color, brightness, etc., as described above with reference to FIGS. 11, 13, and 14, then console 510 can rely in part or in full on such changes to determine an intensity value relative to the extent of deformation. Using stress-sensitive materials or embedded circuitry, there may be no limit on the shape of the deformable object. This opens up new possibilities in man-machine interactivity. For example, the tightness with which a baseball bat is gripped can be used to as a measure of how hard the swing is in a baseball simulation. In the emerging field of affective computing, computers are using various techniques such as posture and facial expression to identify the mood of the user. In a similar manner, the present technology allows game developers to modify game play based on intensity values exhibited by a user. For example, an intensity value which can be indicative of such emotions as fear, anger, or excitement can be sensed by how tightly a toy gun is being gripped, which can then be used to alter computer-generated character responses.

Figure 15:
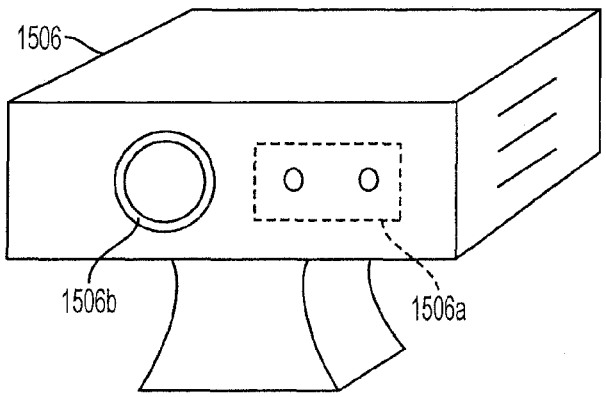
FIG. 15 shows a monitor having an image capture unit and a sound capture unit.

In a different embodiment, intensity of interaction can be received by sound in addition to, or instead of, by imaging. Rather than a camera 105, in this embodiment, a monitor 1506, shown by way of example in FIG. 15, may be provided which includes image capture unit 1506*b* and a sound capture unit 1506*a*. A sound source can be a noise generated by an input object, device, a hand clap or a foot tap, or any other noise. The sound will then be captured by the sound capture unit 1506*a*, and processed by the computing system 102 (FIG. 1) for interaction. Voice recognition may be used to enable the identification of voice commands. In addition, the user may be in communication with remote users connected to the Internet or network, but who are also directly or partially involved in the interactivity of the game.

In accordance with one embodiment of the present invention, the sound capture unit 1506*a* may be configured to include at least two microphones which will enable the computing system 102 to select sound coming from particular directions. By enabling the computing system 102 to filter out sounds from directions which are not central to the interactivity, distracting sounds in the environment will not interfere with or confuse the execution of the interactive program determining an intensity value of the sound generated by the input object, device, or other means. In a similar manner, the sound capture unit can isolate sounds from a target focus zone to reliably identify an intensity value. As will be described below, the zone of focus may be identified by the active image area that is the focus point of the image capture unit 1506*b*. In an alternative manner, the zone of focus can be manually selected from a choice of zones presented to the user after an initialization stage.

The image-sound capture device 1506 includes an image capture unit 1506*b*, and the sound capture unit 1506*a*. The image-sound capture device 1506 may be capable of digitally capturing image frames and then transferring those image frames to the computing system 102 (FIG. 1) for further processing. An example of the image capture unit 1506*b* may be a web camera, which is commonly used when video images are desired to be captured and then transferred digitally to a computing device for subsequent storage or communication over a network, such as the Internet. Other types of image capture devices are also contemplated, whether analog or digital, so long as the image data is digitally processed to enable the identification and filtering. In one preferred embodiment, the digital processing to enable the filtering may be done in software, after the input data is received. The sound capture unit 1506*a* is shown including a pair of microphones (MIC1 and MIC2). The microphones are standard microphones, which can be integrated into the housing that makes up the image-sound capture device 1506.

Figure 16:
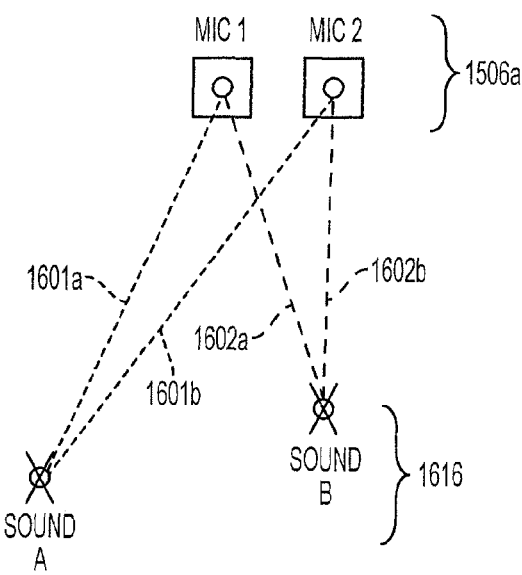
FIG. 16 illustrates sound capture units when confronted with two sound sources.
Figure 17:
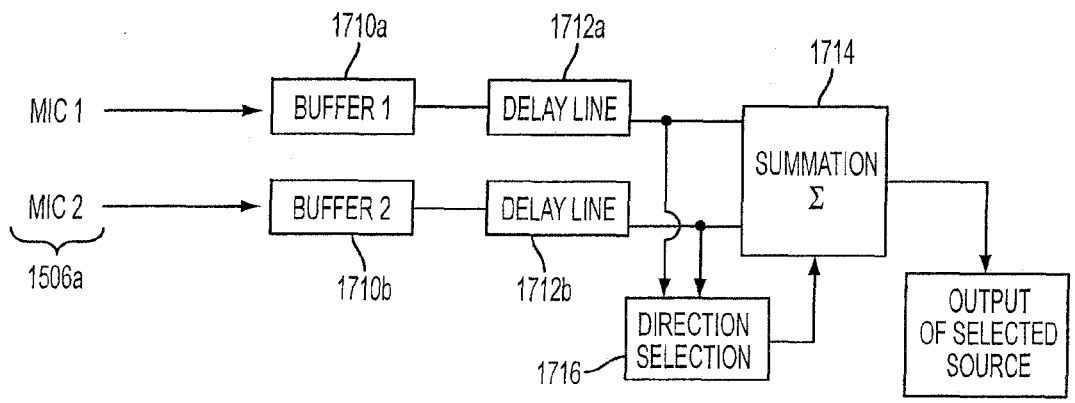
FIG. 17 illustrates the processing of sound A and sound B using a triangulation algorithm so that direction selection can occur.

FIG. 16 illustrates sound capture units 1506*a* when confronted with sound sources 1616 from sound A and sound B. As shown, sound A will project its audible sound and will be detected by MIC1 and MIC2 along sound paths 1601*a* and 1601*b*. Sound B will be projected toward MIC1 and MIC2 over sound paths 1602*a* and 1602*b*. As illustrated, the sound paths for sound A will be of different lengths, thus providing for a relative delay when compared to sound paths 1602*a* and 1602*b*. The sound coming from each of sound A and sound B will then be processed using a standard triangulation algorithm so that direction selection can occur in box 1716, shown in FIG. 17. The sound coming from MIC1 and MIC2 will each be buffered in buffers 1 and 2 (1710a, 1710b), and passed through delay lines (1712a, 1712b). In one embodiment, the buffering and delay process will be controlled by software, although hardware can be custom designed to handle the operations as well. Based on the triangulation, direction selection 1716 will trigger identification and selection of one of the sound sources 1616.

The sound coming from each of MICs1 and MICs2 will be summed in box 1714 before being output as the output of the selected source. In this manner, sound coming from directions other than the direction in the active image area will be filtered out so that such sound sources do not distract processing by the computer system 102 (FIG. 1) or distract communication with other users that may be interactively playing a video game over a network, or the Internet.

A video game or other application utilizing this technology can reliably identify and quantify an intensity value of a sound originating from a zone of focus at a predetermined or selected direction relative the sound capture device. The intensity value may correlate to the loudness or volume of the sound, the rapidity of the sound, and/or the pitch of the sound. Rapidity is the number of repetitions of a sound in a particular segment of time. In some instances, the intensity may be greater at higher volumes, greater rapidity, or higher pitch. In other instances, the intensity may be greater at reduced volumes, less rapidity, or lower pitch, depending on the application. In any case, isolating the sound from ambient sound and other sound generated in the room enables a more reliable determination of the intensity amount.

Figure 18:
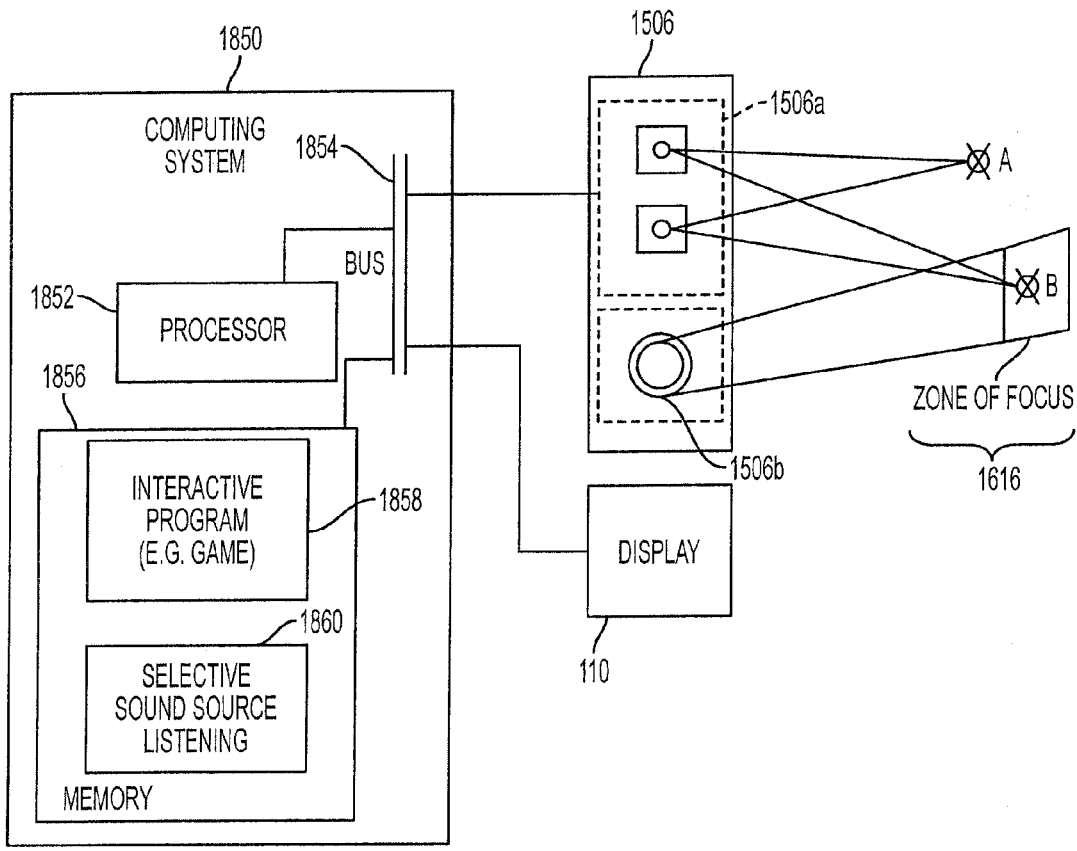
FIG. 18 illustrates a computing system that may be used in conjunction with an image-sound capture device.

FIG. 18 illustrates a computing system 1850 that may be used in conjunction with the image-sound capture device 1506, in accordance with one embodiment of the present invention. The computing system 1850 includes a processor 1852, and memory 1856. A bus 1854 will interconnect the processor and the memory 1856 with the image-sound capture device 1506. The memory 1856 will include at least part of the interactive program 1858, and also include selective sound source listening logic or code 1860 for processing the received sound source data. Based on where the zone of focus is identified to be by the image capture unit 1506b, sound sources outside of the zone of focus will be selectively filtered by the selective sound source listening logic 1860 being executed (e.g., by the processor and stored at least partially in the memory 1856). The computing system is shown in its most simplistic form, but emphasis is placed on the fact that any hardware configuration can be used, so long as the hardware can process the instructions to effect the processing of the incoming sound sources and thus enable the selective listening.

The computing system 1850 is also shown interconnected with the display 110 by way of the bus. In this example, the zone of focus may be identified by the image capture unit being focused toward the sound source B. Sound coming from other sound sources, such as sound source A will be substantially filtered out by the selective sound source listening logic 1860 when the sound is captured by the sound capture unit 1506a and transferred to the computing system 1850.

In one specific example, a player can be participating in an Internet or networked video game competition with another user where each user's primary audible experience will be by way of speakers. The speakers may be part of the computing system or may be part of the monitor 1506. Suppose, therefore, that the local speakers are what may be generating sound source A as shown in FIG. 4. In order not to feedback the sound coming out of the local speakers for sound source A to the competing user, the selective sound source listening logic 1860 will filter out the sound of sound source A so that the competing user will not be provided with feedback of his or her own sound or voice. By supplying this filtering, it is possible to have interactive communication over a network while interfacing with a video game, while advantageously avoiding destructive feedback during the process.

Figure 19:
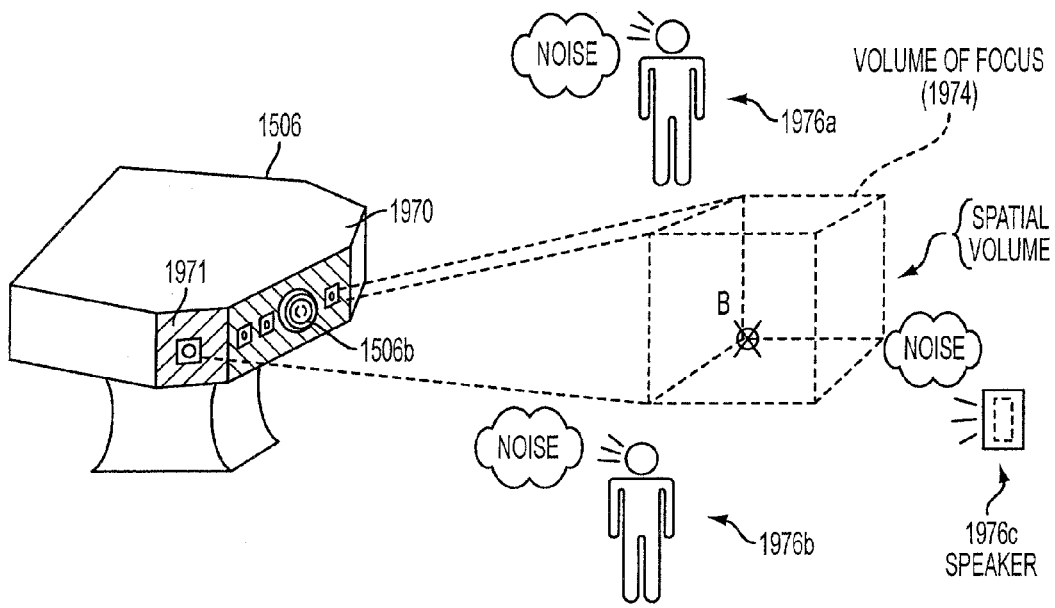
FIG. 19 illustrates an exemplary audio monitor including at least four microphones.

FIG. 19 illustrates an exemplary monitor 1506 including at least four microphones (MIC1 through MIC4). The sound capture unit 1506a, is therefore capable of triangulation with better granularity to identify the location of sound sources 1616 (A and B). That is, by providing an additional microphone, it is possible to more accurately define the location of the sound sources and thus, eliminate and filter out sound sources that are not of interest or can be destructive to game play or interactivity with a computing system. As illustrated in FIG. 18, sound source 1616 (B) may be the sound source of interest as identified by the video capture unit 1506b. Continuing with example of FIG. 18, FIG. 19 identifies how sound source B is identified to a spatial volume.

The spatial volume at which sound source B is located will define the volume of focus 1974. By identifying a volume of focus, it is possible to eliminate or filter out noises that are not within a specific volume (i.e., which are not just in a direction). To facilitate the selection of a volume of focus 1974, the image-sound capture device monitor 1506 will preferably include at least four microphones. At least one of the microphones will be in a different plane than three of the microphones. By maintaining one of the microphones in plane 1971 and the remainder of the four in plane 1970 of the image-sound capture device monitor 1506, it is possible to define a spatial volume.

Consequently, noise coming from other people in the vicinity (shown as 1976a and 1976b) will be filtered out as they do not lie within the spatial volume defined in the volume focus 1974. Additionally, noise that may be created just outside of the spatial volume, as shown by speaker 1976c, will also be filtered out as it falls outside of the spatial volume.

An exemplary implementation of a filtering algorithm will now be described with reference to FIGS. 20-22. This implementation example provides an audio input system associated with a portable consumer device through a microphone array. The voice input system may be capable of isolating a target audio signal from multiple noise signals. Additionally, there are no constraints on the movement of the portable consumer device, which has the microphone array affixed thereto. The microphone array framework includes four main modules in one embodiment of the invention. The first module may be an acoustic echo cancellation (AEC) module. The AEC module may be configured to cancel portable consumer device generated noises. For example, where the portable consumer device is a video game controller, the noises, associated with video game play, i.e., music, explosions, voices, etc., are all known. Thus, a filter applied to the signal from each of the microphone sensors of the microphone array may remove these known device generated noises. In another embodiment, the AEC module may be optional and may not be included with the modules described below. Further details on acoustic echo cancellation may be found in "Frequency-Domain and Multirate Adaptive Filtering" by John J. Shynk, IEEE Signal Processing Magazine, pp. 14-37, January 1992. This article is incorporated by reference for all purposes.

Figure 20:
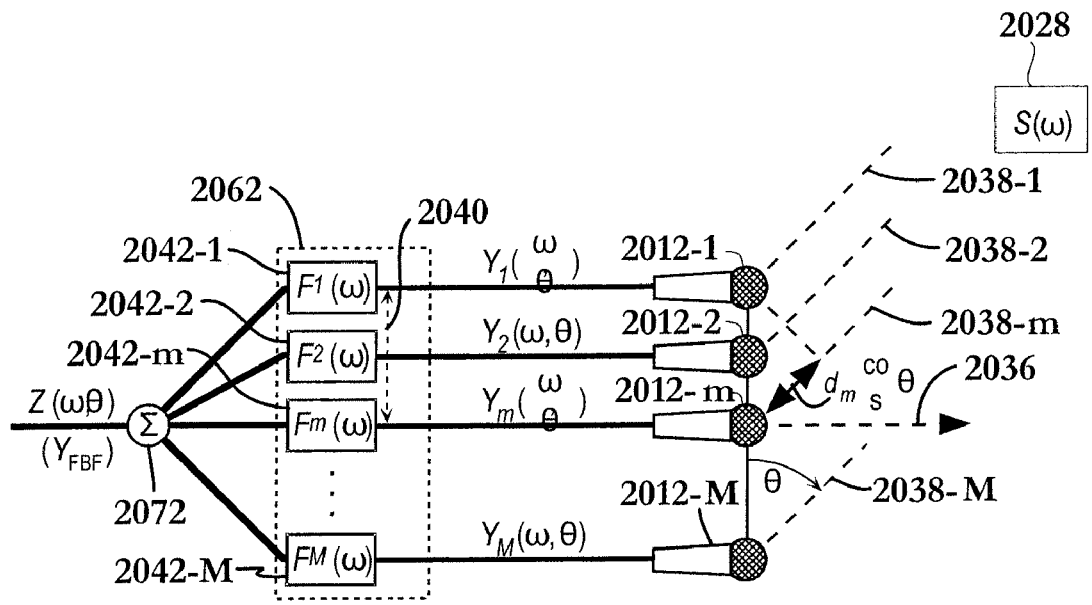
FIG. 20 shows a simplified schematic diagram illustrating an array beam-forming module.

FIG. 20 is a simplified schematic diagram illustrating an array beam-forming module configured to suppress a signal not coming from a listening direction in accordance with one embodiment of the invention. In one embodiment, the beam-forming may be based on filter-and-sum beam-forming. The finite impulse response (FIR) filters, also referred to as signal passing filters, are generated through an array calibration process which may be adaptive. Thus, the beam-forming may be essentially an adaptive beam-former that can track and steer the beam, i.e., listening direction, toward a source signal 2028 without physical movement of the sensor array. It will be apparent to one skilled in the art that beam-forming, which refers to methods that can have signals from a focal direction enhanced, may be thought of as a process to algorithmically (not physically) steer microphone sensors 2012-1 through 2012-M towards a desired target signal. The direction that the sensors 112-1 through 112-M look at may be referred to as the beam-forming direction or listening direction, which may either be fixed or adaptive at run time.

The fundamental idea behind beam-forming is that the sound signals from a desired source reaches the array of microphone sensors with different time delays. The geometry placement of the array being pre-calibrated, thus, the path-length-difference between the sound source and sensor array is a known parameter. Therefore, a process referred to as cross-correlation may be used to time-align signals from different sensors. The time-align signals from various sensors are weighted according to the beam-forming direction. The weighted signals are then filtered in terms of sensor-specific noise-cancellation setup, i.e., each sensor may be associated with a filter, referred to as a matched filter $F_1$ $F_M$, 2042-1 through 2042-M, which are included in signal-passing-filter 2062. The filtered signals from each sensor are then summed together through module 2072 to generate output $Z(\omega,\theta)$. It should be appreciated that the above-described process may be referred to as auto-correlation. Furthermore, as the signals that do not lie along the beam-forming direction remain misaligned along the time axes, these signals become attenuated by the averaging. As is common with an array-based capturing system, the overall performance of the microphone array to capture sound from a desired spatial direction (using straight line geometry placement) or spatial volumes (using convex geometry array placement) depends on the ability to locate and track the sound source. However, in an environment with complicated reverberation noise, e.g., a videogame environment, it is practically infeasible to build a general sound location tracking system without integrating the environmental specific parameters.

Still referring to FIG. 20, the adaptive beam-forming may be alternatively explained as a two-part process. In a first part, the broadside noise is assumed to be in a far field. That is, the distance from source 2028 to microphone centers 2012-1 through 2012-M is large enough so that it may be initially assumed that source 2028 is located on a normal to each of the microphone sensors. For example, with reference to microphone sensor 2012-m the source would be located along normal 2036. Thus, the broadside noise may be enhanced by applying a filter referred to as F1 herein. Next, a signal passing filter that may be calibrated periodically may be configured to determine a factor, referred to as F2, that allows the microphone sensor array to adapt to movement. The determination of F2 is explained further with reference to the adaptive array calibration module. In one embodiment, the signal passing filter may be calibrated every 100 milliseconds. Thus, every 100 milliseconds the signal passing filter may be applied to the fixed beam-forming. In one embodiment, matched filters 2042-1 through 2042-M supply a steering factor, F2, for each microphone, thereby adjusting the listening direction as illustrated by lines 2038-1 through 2038-M. Considering a sinusoidal far-field plane wave propagating towards the sensors at incidence angle of $\theta$ in FIG. 20, the time-delay for the wave to travel a distance of d between two adjacent sensors may be given by $d_m \cos\theta$. Further details on fixed beam-forming may be found in the article entitled "Beamforming: A Versatile Approach to Spatial Filtering" by Barry D. Van Veen and Kevin M. Buckley, IEEE ASSP MAGAZINE April 1988. This article is incorporated by reference for all purposes.

Figure 21:
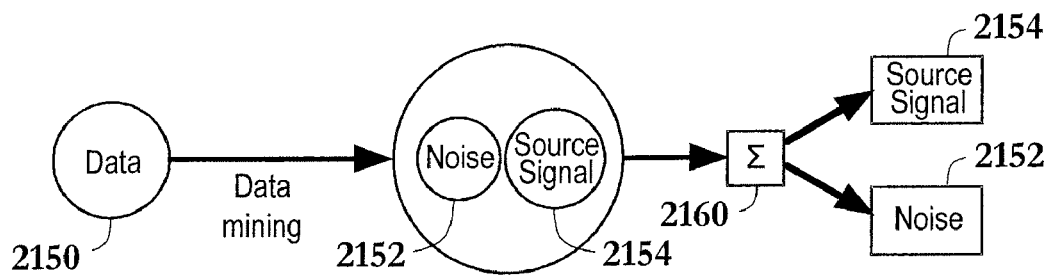
FIG. 21 shows a high level schematic diagram illustrating a blind source separation scheme for separating the noise and source signal components of an audio signal.

FIG. 21 shows a high level schematic diagram illustrating a blind source separation scheme for separating the noise and source signal components of an audio signal. It should be appreciated that explicit knowledge of the source signal and the noise within the audio signal may not be available. However, it is known that the characteristics of the source signal and the noise are different. For example, a first speaker's audio signal may be distinguished from a second speaker's audio signal because their voices are different and the type of noise is different. Thus, data 2150 representing the incoming audio signal, which includes noise and a source signal, may be separated into a noise component 2152 and source signal 2154 through a data mining operation. Separation filter 2160 then separates the source signal 2150 from the noise signal 2152.

One skilled in the art will appreciate that one method for performing the data mining may be through independent component analysis (ICA) which analyzes the data and finds independent components through second order statistics in accordance with one embodiment of the invention. Thus, a second order statistic may be calculated to describe or define the characteristics of the data in order to capture a sound fingerprint which distinguishes the various sounds. The separation filter may then enabled to separate the source signal from the noise signal. It should be appreciated that the computation of the sound fingerprint may be periodically performed. Thus, through this adaptive array calibration process that utilizes blind source separation, the listening direction may be adjusted each period. Once the signals are separated by separation filter 2160 it will be apparent to one skilled in the art that the tracking problem may be resolved. That is, based upon the multiple microphones of the sensor array the time arrival of delays may be determined for use in tracking source signal 2154. One skilled in the art will appreciate that the second order of statistics referred to above may be referred to as an auto correlation or cross correlation scheme. Further details on blind source separation using second order statistics may be found in the article entitled "System Identification Using Non-Stationary Signals" by O. Shalvi and E. Weinstein, IEEE Transactions on Signal Processing, vol-44 (no. 8): 2055-2063, August, 1996. This article is hereby incorporated by reference for all purposes.

Figure 22:
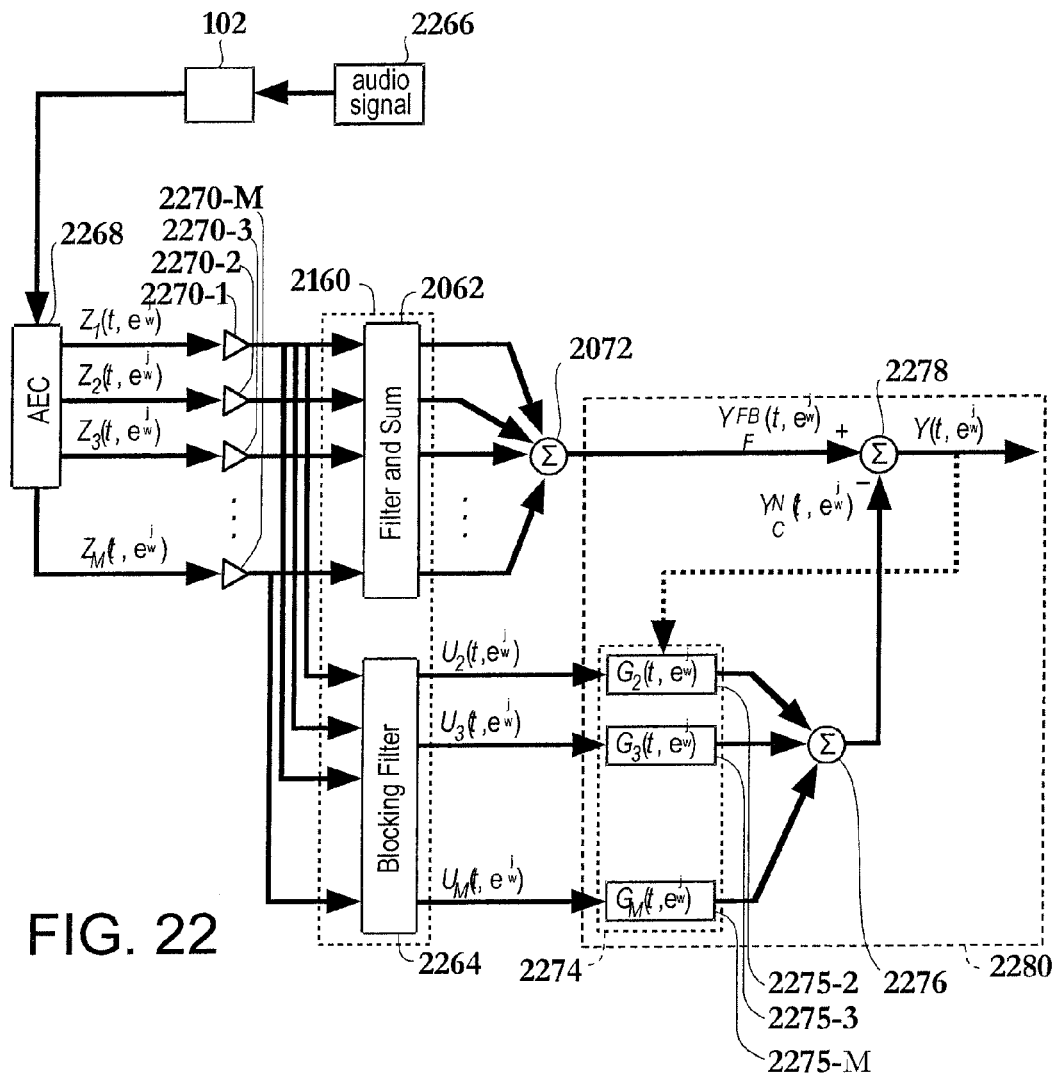
FIG. 22 is a schematic diagram illustrating a microphone array framework that incorporates adaptive noise cancellation.

FIG. 22 is a schematic diagram illustrating a microphone array framework that incorporates adaptive noise cancellation. Audio signal 2266 which includes noise and a source signal may be received through a microphone sensor array which may be affixed to a portable consumer device 102, e.g., a videogame console or computing device. The audio signal received by portable consumer device 102 may then be pre-processed through acoustic echo cancellation (AEC) module 168. Here, acoustic echo cancellation may be performed as described by way of example in U.S. patent application Ser. No. 10/650,409, which is incorporated herein by reference. Signals $Z_1$ through $Z_M$, which correspond to the number of microphone sensors in the microphone array, are generated and distributed over channels 2270-1 through 2270-M. It should be appreciated that channel 2270-1 may be a reference channel. The corresponding signals are then delivered to filter-and-sum module 2062. It should be appreciated that filter-and-sum module 2062 performs the adaptive beam-forming as described above with reference to FIG. 20. At the same time, signals from channels 2270-1 through 2270-M are delivered to blocking filter 2264.

Blocking filter 2264 may be configured to perform reverse beam-forming where the target signal may be viewed as noise. Thus, blocking filter 2264 attenuates the source signal and enhances noise. That is, blocking filter 2264 may be configured to determine a calibration coefficient F3 which may be considered the inverse of calibration coefficient F2 determined by the adaptive beam-forming process. One skilled in the art will appreciate that the adaptive array calibration referred to with reference to FIG. 21, occurs in the background of the process described herein. Filter-and-sum module 2062 and blocking filter module 2264 make up separation filter 2160. Noise enhanced signals $U_2$ through $U_M$ are then transmitted to corresponding adaptive filters 2275-2 through 2275-M, respectively. Adaptive filters 2275-2 through 2275-M are included in adaptive filter module 2274. Here, adaptive filters 2275-2 through 2275-M are configured to align the corresponding signals for the summation operation in module 2276. One skilled in the art will appreciate that the noise may not stationary, therefore, the signals must be aligned prior to the summation operation.

Still referring to FIG. 22, the signal from the summation operation of module 2276 may then combined with the signal output from summation operation in module 2272 in order to provide a reduced noise signal through the summation operation module 2278. That is, the enhanced signal output for module 2272 may be combined with the enhanced noise signal from module 2276 in a manner that enhances the desired source signal. It should be appreciated block 2280 represents the adaptive noise cancellation operation. Additionally, the array calibration occurring in the background may take place every 100 milliseconds as long as a detected signal-to-noise-ratio may be above zero decibels in one embodiment. As mentioned above, the array calibration updates the signal-passing-filter used in filter-and-sum beamformer 2062 and signal-blocking-filter 2264 that generates pure interferences whose signal-to-noise-ratio may be less than −100 decibels.

In one embodiment, the microphone sensor array output signal may be passed through a post-processing module to further refine the voice quality based on person-dependent voice spectrum filtering by Bayesian statistic modeling. Further information on voice spectrum filtering may be found in the article entitled "Speech Enhancement Using a Mixture-Maximum Model" by David Burshtein, IEEE Transactions on Speech and Audio Processing vol. 10, No. 6, September 2002. This article in incorporated by reference for all purposes. It should be appreciated that the signal processing algorithms mentioned herein are carried out in the frequency domain. In addition, a fast and efficient Fast Fourier transform (FFT) may be applied to reach real time signal response. In one embodiment, the implemented software requires 25 FFT operations with window length of 1024 for every signal input chunk (512 signal samples in a 16 kHz sampling rate). In the exemplary case of a four-sensor microphone array with equally spaced straight line geometry, without applying acoustic echo cancellation and Bayesian model base voice spectrum filtering, the total computation involved may be about 250 mega floating point operations (250 M Flops).

Continuing with FIG. 22, separation filter 2160 may be decomposed into two orthogonal components that lie in the range and null space by QR orthogonalization procedures. That is, the signal blocking filter coefficient, F3, may be obtained from the null space and the signal passing filter coefficient, F2, may be obtained from the rank space. This process may be characterized as Generalized Sidelobe Canceler (GSC) approach. Further details of the GSC approach may be found in the article entitled "Beamforming: A Versatile Approach to Spatial Filtering" which has been incorporated by reference above.

The above described embodiment describes a method and a system for providing audio input in a high noise environment. The audio input system includes a microphone array that may be affixed to a video game controller, e.g., a SONY PLAYSTATION 2® video game controller or any other suitable video game controller. The microphone array may be configured so as to not place any constraints on the movement of the video game controller. The signals received by the microphone sensors of the microphone array are assumed to include a foreground speaker or audio signal and various background noises including room reverberation. Since the time-delay between background and foreground from various sensors may be different, their second-order statistics in frequency spectrum domain are independent of each other, therefore, the signals may be separated on a frequency component basis. Then, the separated signal frequency components are recombined to reconstruct the foreground desired audio signal. It should be further appreciated that the embodiments described herein define a real time voice input system for issuing commands for a video game, or communicating with other players within a noisy environment.

Figure 23:
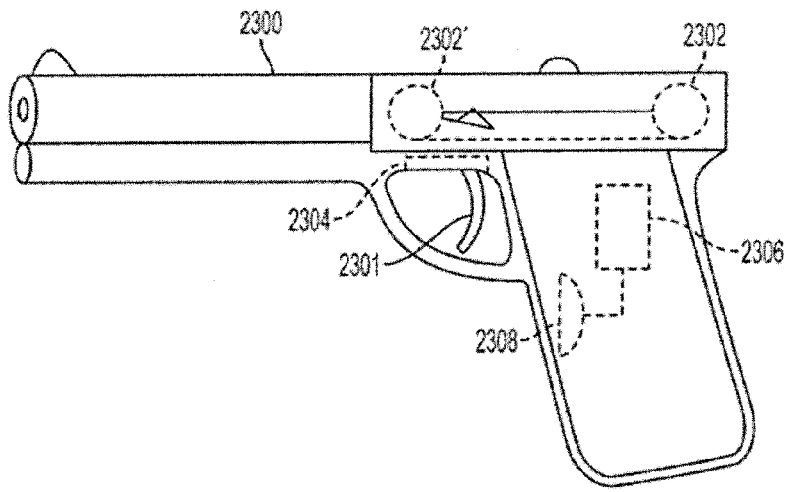
FIG. 23 shows an exemplary toy gun having a trigger and a trigger sensor for interfacing with an audio monitor.

FIG. 23 shows an exemplary toy gun 2300 having a trigger 2301 and a trigger sensor 2304. In addition, toy gun 2300 contains a marble 2302. In one embodiment marble 2302 comprises a solid metal ball bearing. The user can flick gun 2300 cause marble 2302 to slide forward to position 2302' to make a loud "crack" sound, which can then be perceived by monitor 1506. In addition, or alternatively, the user can squeeze trigger 2301, which may be sensed by trigger sensor 2304. Toy gun 2300 contains a circuit 2306 that generates a gun shot sound effect out of speaker 2308. In one embodiment, the harder trigger 2301 may be squeezed, the more rapidly the gunshot effect, or different effects, are produced. Computing system 1850 (FIG. 18) may be capable of distinguishing between the different sounds and can effect a "reload" operation in response to receiving the "crack" sound generated by marble 2002, and a shooting operation in the virtual environment in response to trigger 2301 being squeezed. In a different embodiment, as the trigger may be squeezed to a greater amount, a sound generated may be at a higher or different pitch (frequency). The higher the pitch the increased intensity may be obtainable by monitor 1506.

While a toy gun is shown in FIG. 20, persons skilled in the art will recognize that other input devices, such as a plush doll, ball, or other implement or toy can be imagined and used with the audio capture 1506a. The exemplary embodiment described here shows how changes in sound volume, frequency, or rapidity can be interpreted by a computer system to identify an intensity value indicating an interaction with an interface object. In one example, a toy doll may respond differently to being hugged or squeezed by generating different sounds which can be picked up by the sound capture unit.

FIG. 24 illustrates a flowchart diagram 2400. The procedure begins as indicated by start block 2402 and proceeds to operation 2404 wherein a capture region may be monitored using a capture device that has video and/or audio capture capability. The procedure flows to operation 2406 wherein an input device may be detected within the capture region. An initial shape of the input device may be detected. The input device can be detected by its color or shape. For example, if the input device is an orange ball, the video monitor will look for a round orange shape and determine that that is the input device.

The procedure continues at operation 2408 wherein the extent of change of shape, color, or brightness of the input device may be detected. In one embodiment the input device changes color or becomes increasingly illuminated when deformed. In another embodiment, the input device simply changes shape, e.g., when squeezed by a user. The video monitor can detect the change in shape, color, or brightness of the device and identify an intensity value from the extent of change.

The procedure continues with operation 2410 wherein an activity input is triggered by the computer program being run on a computer in communication with the capture device. The activity input can include the intensity value calculated from the extent of deformation, illumination, or color perceived by the video capture device. The procedure then ends as indicated by finish block 2412.

FIG. 25 shows a second flowchart 2500. In this procedure, which begins as indicated by start block 2502, a capture region may be monitored using a capture device having video and audio capability as indicated in operation 2504. Next, in operation 2506, a sound generated by an input device may be detected. The procedure then flows to operation 2508 wherein an intensity value may be calculated based on a loudness or rapidity of sound generated by the input device. In another embodiment, a frequency (pitch) of the sound can be used to determine the intensity value.

The procedure then flows to operation 2510 wherein an activity input may be provided to a computer program being run on a computer that may be in communication with the capture device. The activity input may include a value representative of the intensity value determined from the sound generated by the input device. The procedure then ends as indicated by finish block 2512.

There may be instances in a focus zone in which a video game controller may be desirable for interacting with a video game or other computer program. A video game controller may typically a hand-held device having buttons, knobs, and/or joysticks for providing input into a video game program for controlling action within the game. It would be desirable to add additional functionality to the controller by sensing movement and/or rotation of the controller in space. Thus, a user, for example, can steer a virtual racecar by tilting the whole controller device, which can then be sensed by an image capture device as described above with reference to FIGS. 1-14. Traditionally, video game controllers provide a stream of analog signals and/or digital data over a cable or wirelessly using one or more of available infra-red or radio frequency (RF) interfaces. For multiplayer gaming, more than one controller may be placed into electronic communication with the computer system (e.g., the game console). Each person interacting with the program may be assigned a number, e.g., "Player 1," "Player 2," etc. When game controllers are connected to the system, each user can be assigned a number according to the port number to which the controller is connected. Thus, if a computer game has four ports, Player 1 is connected to port number 1, Player 2 is connected to port number 2, etc. Wireless controllers allow players to select their player number based on a wireless channel or other hand-shake protocol mechanism allowing the controller to identify itself as for Player 1, Player 2, and so on.

Figure 27:
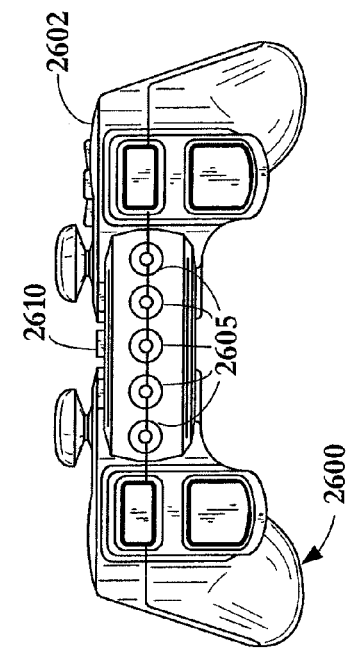
FIGS. 26 and 27 show plan and rear elevation views, respectively, of an exemplary controller for interacting with the image capture device of FIG. 1.
Figure 26:
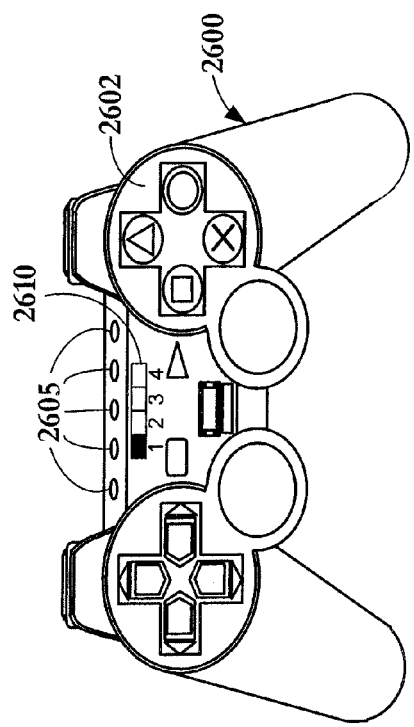

FIGS. 26 and 27 show an exemplary controller 2600 that interacts with an image capture device 105 (FIG. 1). Controller 2600 includes an interface 2602 containing a plurality of interface devices including various buttons and joysticks. The controllers discussed herein can be either wired or wireless. Technologies, such as WiFi, Bluetooth™, IR, sound, and lights may work to interface with a computer, such as a game console. In one embodiment, controller 2600 has an LED array 2605. The LED array may be configured in various layouts, including a 2×2 stack where each LEDs may be positioned at a vertex of an imaginary rectangular or square-shaped binding box. By tracking the position and deformation of the binding box as it is projected onto the image plane produced by an image capture device, the transformation and deformations may be analyzed in a video analyzer to decipher position and orientation information of the controller. LED array 2605 may generate infrared or visible light. Inage capture device 105 (FIG. 1) can identify LED array 2605 as described above with reference to various other inventive embodiments. Each controller can be designated as Player 1 through, for example, Player 4, using switch 2610, which allows a user selection of player number 1-4. Each player number selection corresponds to a unique pattern or modulation of LEDs being illuminated by LED array 2605. For example, for Player 1, 1st, 3rd, and 5th LEDs are illuminated. Such player information may be encoded and transmitted in a repeated fashion over time across multiple video frames. It may be desirable to engage in an interleave scheme so the controller or device LEDS can switch between a tracking mode and a transmission mode. In the tracking mode, all LEDs may be turned on during a first portion of a cycle. In the transmission mode, information may be modulated by the LEDs during a second portion of a cycle. Over time, the LEDS transmit tracking and communications information to a video analyzer or suitable device capable of receiving the signal. In the transmission mode, the LEDs may encode information representative of the player I.D. The period and duty cycle may be chosen to accommodate speed of tracking, lighting conditions, number of controllers, etc. By interleaving communications and tracking information, a video capture device may be supplied with adequate information to compute tracking parameters for each controller and to discriminate between controllers. Such discrimination may be used in a video analyzer to isolate each physical controller when monitoring and tracking the position and orientation and other metrics of the controller movement.

In the transmission mode, other information, including commands or state information may be transmitted by the controller or device LEDs and according to known encoding and modulation schemes. On the receiver side, a video analyzer coupled to the video capture device may sync with and track the state of the LEDS and decode the information and controller movements. It is known that higher bandwidth may be achieved by modulating data across frames in the transmission mode cycle.

User interaction with interface 2602 may cause one or more of LEDs in LED array 2605 to modulate and/or change color. For example, as a user moves a joystick LEDs may change brightness or transmit information. The changes in intensity or color can be monitored by the computer system and provided to a gaming program as an intensity value as described above with reference to FIGS. 1-14. Furthermore, each button may be mapped to a change in color or intensity of one or more of the LEDs in LED array 2605.

As controller 2600 is moved about in three-dimensional space and rotated in one of a roll, yaw, or pitch direction (explained in greater detail below with reference to FIG. 33) image capture device 105 in conjunction with computer system 102 (FIG. 1) may be capable of identifying these changes and generating a two dimensional vector (for describing movement on the image plane, or a three dimensional vector for describing movement in three dimensional space. The vector can be provided as a series of coordinates describing relative movement and/or an absolute position with respect to the image capture device 105. As would be evident to those skilled in the art, movement on a plane perpendicular to the line of sight of image capture device 105 (the image plane) can be identified by an absolute position within the image capture zone, while movement of controller 2600 closer to image capture device 105 can be identified by LED array 2605 appearing to spread out, i.e., the distance between the first and last LED on the image plane can be measured to calculate distance from the image capture device.

Figure 29A:
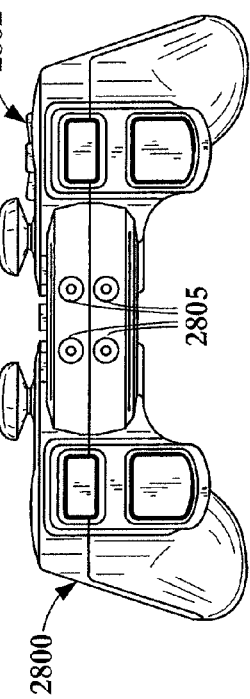
FIGS. 28 and 29a show plan and rear elevation views, respectively, of a controller having a rectangular configuration of LEDs.
Figure 28:
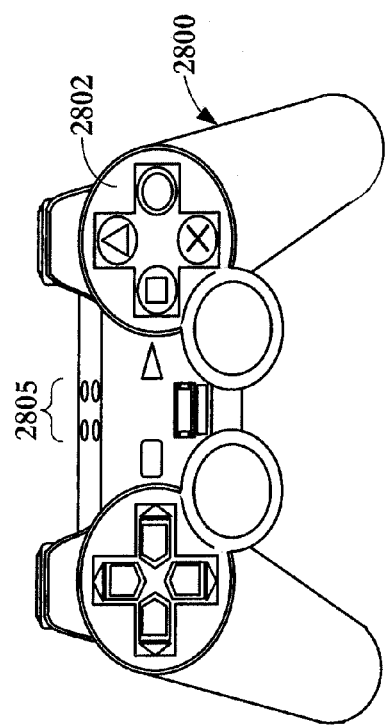

FIGS. 28 and 29*a* show a controller 2800 having a rectangular configuration of LEDs 2805, thereby allowing movement of controller 2800 on three and rotation about each axis to be detected. Although only LEDs are shown, it should be recognized that this is for exemplary purposes only, and any number of LEDs distributed on a plane, and not collinear, would be possible. As controller 2800 may be pitched forward or backward, the top and bottom LEDs will get closer to each other while the left and right LEDs remain the same distance apart. Likewise, as controller 2800 yaws left or right, the left and right LEDs will appear to approach each other while the top and bottom LEDs remain the same distance apart. Rolling motion of controller 2800 can be detected by identifying the orientation of the LEDs on the image plane. As the controller moves closer to image capture device 105 along the line of sight thereof, all the LEDs will appear to be closer to each other. Finally, the controller's movement along the image plane can be tracked by identifying the location of the LEDs on the image plane, thereby identifying movement along respective x and y axes. As mentioned above with respect to FIGS. 26 and 27, LED modulation can be used to identify user interactions with interface 2802.

Figure 29B:
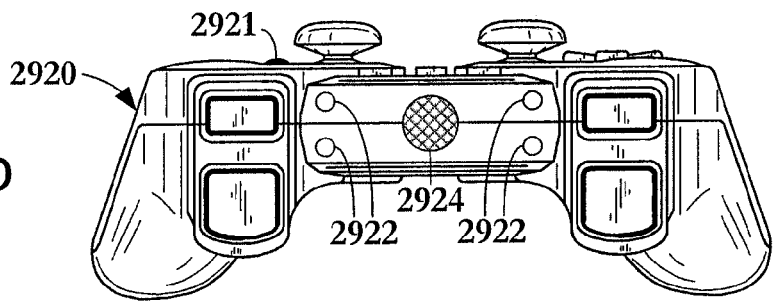
FIG. 29b shows a rear elevation view of a controller incorporates LEDs, a speaker, and a microphone.

FIG. 29*b* shows controller 2920 according to another embodiment, which incorporates LEDs 2922, a speaker 2924, and a microphone 2926. LEDs 2922 provide position and orientation information using an image capture device, while speaker 2924 can generate audible or ultrasonic sound, providing sound effects and/or communication using an audio monitor as described above with reference to FIGS. 15-23. Microphone 2926 provides sound input to the system, which can be used for issuing voice commands, or for communicating with other players in an on-line multiplayer environment.

Figure 29C:
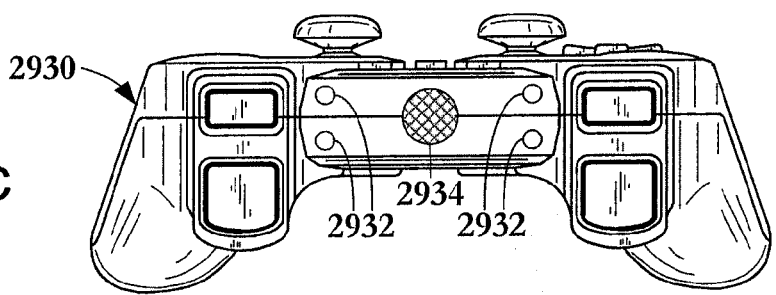
FIG. 29c shows a rear elevation view of a controller having LEDs in a rectangular configuration along with centrally located speaker on a rear panel thereof.
Figure 29D:
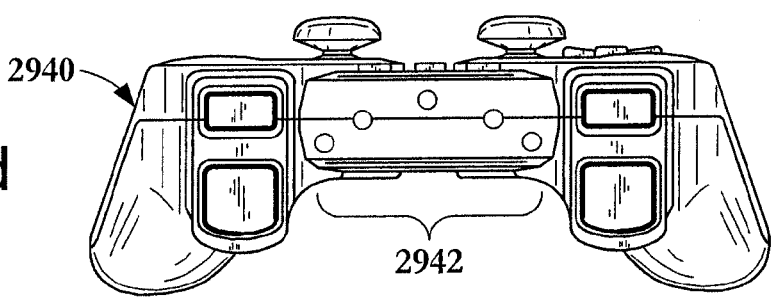
FIG. 29d shows a rear elevation view of controller having five LEDs arranged in an arc formation.
Figure 29E:
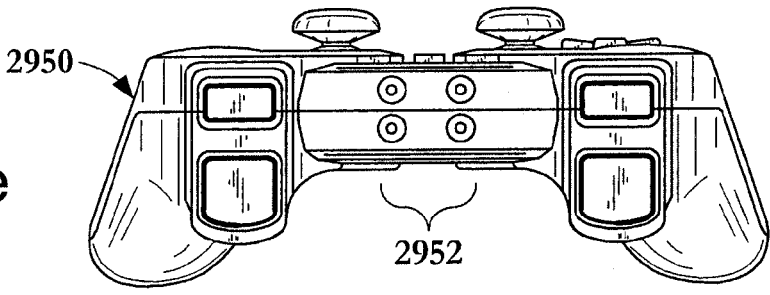
FIG. 29e shows a rear elevation view of a controller having LEDs arranged in a wide rectangular configuration.
Figure 29F:
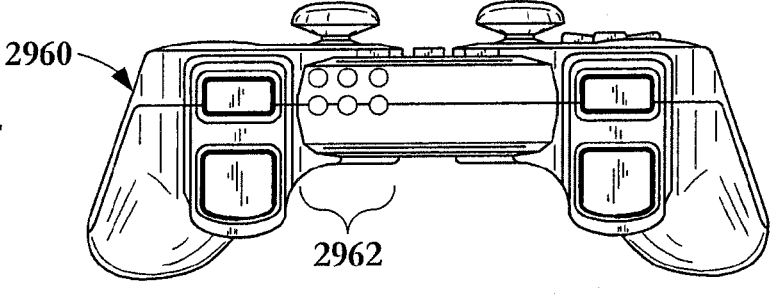
FIG. 29f shows a controller having six LEDs arranged in a cluster.

FIG. 29*c* shows a controller 2930 having LEDs 2932 in a rectangular configuration along with centrally located speaker on a rear panel of controller 2930. FIG. 29*d* shows a controller 2940 having five LEDs 2942 arranged in an arc formation. FIG. 29*e* shows a controller 2950 having LEDs arranged in a wide rectangular configuration. FIG. 29*f* shows a controller 2960 having six LEDs 296 arranged in a cluster. Those skilled in the art will recognize that other LED configurations are possible.

Figure 30:
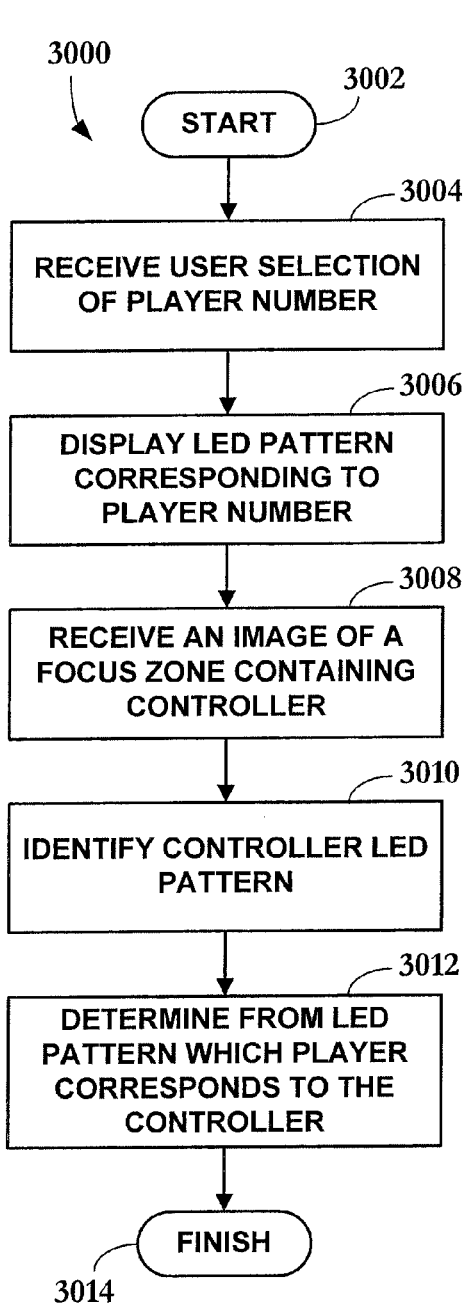
FIG. 30 shows flowchart depicting an exemplary procedure for determining what player corresponds to a particular controller when using an image capture device.

FIG. 30 shows flowchart 3000 depicting an exemplary procedure for determining what player corresponds to a particular controller when using an image capture device. The procedure begins as indicated at start block 3002 and flows to operation 3004. In operation 3004, the player selects what player number he or she wants and that selection may be received by the controller. The procedure then flows to operation 3006 wherein an LED pattern may be displayed that corresponds to the player number selected by the user. In operation 3008, an image of the focus zone containing the controller is received by an image capture device which may be connected to a computer. The computer, having received data representing the image, identifies in operation 3010 the LED pattern generated by the controller, and, in operation 3012, determines from the LED pattern which player corresponds to that controller. The procedure then ends as indicated by finish block 3014.

Figure 31:
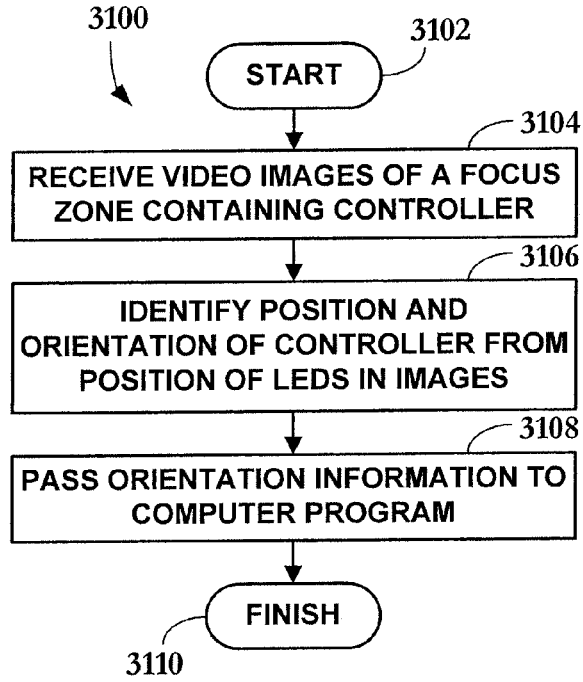
FIG. 31 shows a flowchart representing an exemplary procedure for identifying an orientation of a controller using an image capture device.

FIG. 31 shows a flowchart 3100 representing an exemplary procedure for identifying an orientation of a controller using an image capture device. The procedure begins as indicated by start block 3102 and flows to operation 3104, wherein video images of a focus zone containing a controller are received. Then, in operation 3106, the orientation and/or position of the controller may be identified from the absolute and relative positions of the LEDs on the controller. The orientation and position can be obtained as described above with reference to FIGS. 28 and 29. After identifying the orientation and/or position of the controller, the procedure flows to operation 3108 wherein data representing the orientation and/or position of the controller is passed to a computer program which requested or is otherwise receptive to the data. The procedure then ends as indicated by finish block 3110.

Figure 32:
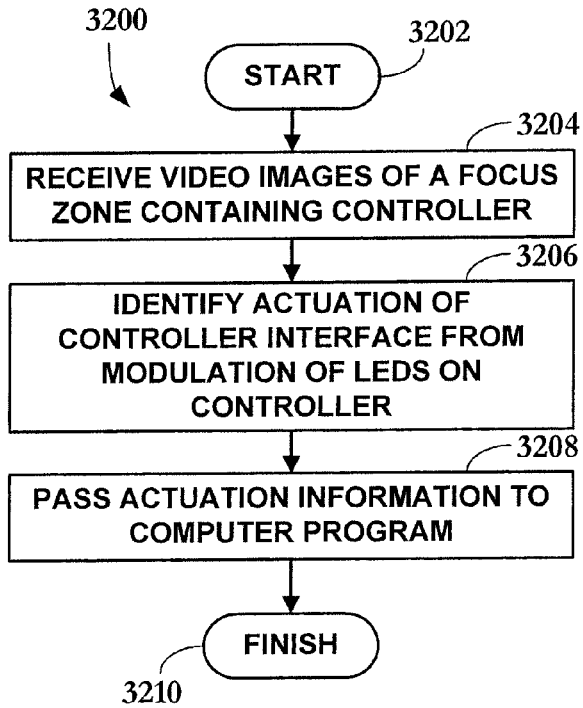
FIG. 32 shows a flowchart representing an exemplary procedure for identifying an orientation of a controller using an image capture device.

FIG. 32 shows a flowchart 3200 representing an exemplary procedure for identifying an orientation of a controller using an image capture device. The procedure begins as indicated by start block 3202 and flows to operation 3204, wherein video images of a focus zone containing a controller are received. Then, in operation 3206, actuation of the interface of the controller, e.g., buttons, switches, joysticks, etc., may be identified from controller LED modulation. This operation may be carried out as described above with reference to FIGS. 26-27. In operation 3208, the actuation information may then passed to the computer program. Finally, the procedure ends as indicated by finish block 3210.

Figure 33:
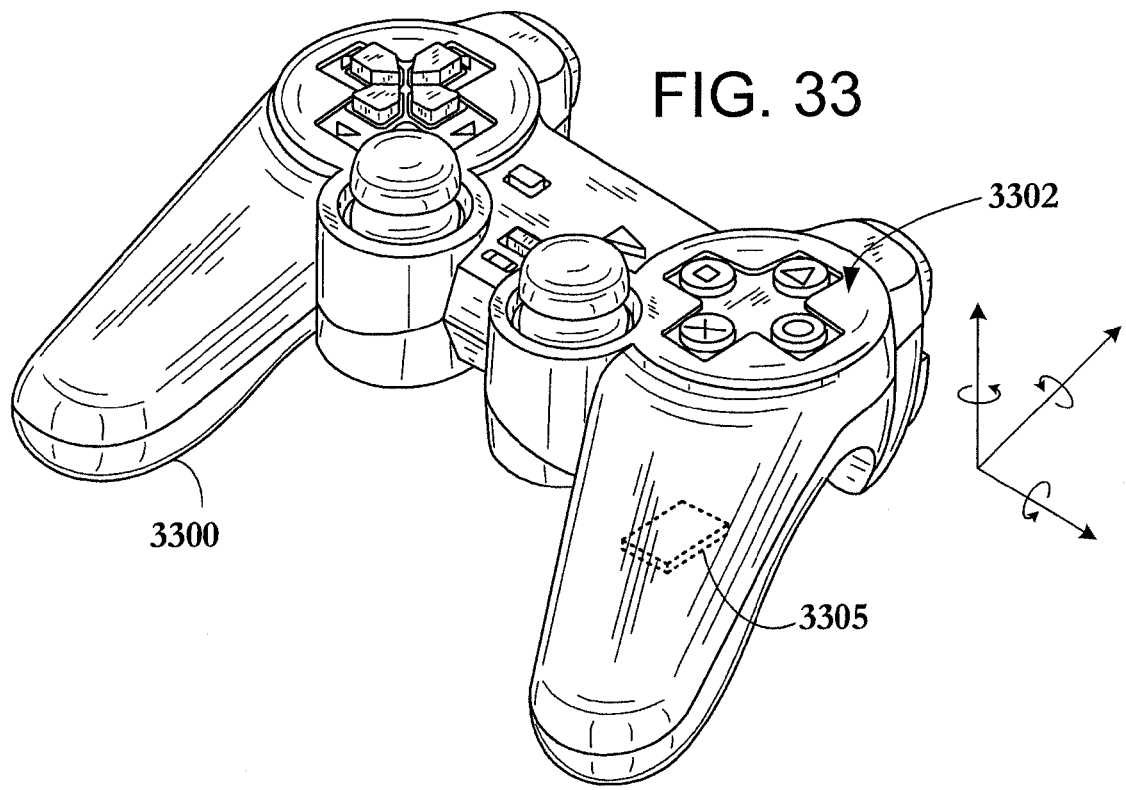
FIG. 33 shows controller having an interface containing a number of controls and a motion sensing device.

FIG. 33 shows controller 3300 having an interface 3302 containing a number of controls and a motion sensing device 3305 therein. In one embodiment, motion sensing device 3305 may be a three axis accelerometer. Accelerometers are generally known in the field of electronics, and typically comprise a small solid state device having structures that respond to changes in momentum, and sensors that detect the responses. Miniaturized accelerometers are available for sensing translational movements as well as rotational movements. Translational movements are movements along x, y, and z axes. Rotational movements are rotations about one or more of the x, y, and z axes. Translation-detecting accelerometers can detect the direction of the pull of gravity, and therefore identify the absolute orientation of a device (such as a game controller) with respect to the pull of gravity. Controller 3300 includes a translation sensing accelerometer 3305, which generates digital data received by a circuit (not shown) contained within controller 3300. The digital data can be converted into translational movement vectors and orientation of the device, determinable from the pull of gravity on the device. In this manner, the circuit identifies motion and orientation of controller 3300 and transmits this data along with other data representing user interaction with various controls of interface 3302. to the game console in a manner generally known in the art, e.g., via a cable, infra-red, or radio connection. It is also possible to encode the data into LED modulations for viewing by an image capture device. The motion captured by the device can be represented as absolute position and orientation information (taking an initial position as the origin) and/or change in position and orientation.

Figure 34:
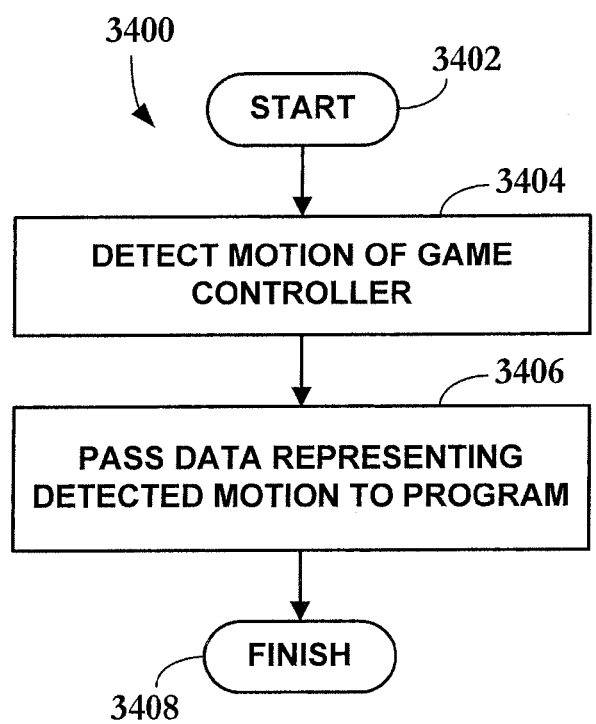
FIG. 34 shows a flowchart depicting an exemplary procedure communicating movement of controller to a computer program.

FIG. 34 shows a flowchart 3400 depicting an exemplary procedure communicating movement of controller 3300 to a computer program. The procedure begins as indicated by start block 3402 and proceeds to operation 3404 wherein the motion of the game controller may be detected. In one embodiment, motion may be detected by detecting changes in momentum of the controller, which may be detected using an accelerometer. The changes in momentum may then be converted into movement vectors and/or absolute position vector from an initial origin, and a vector representing the pull of gravity, which identifies the orientation of controller 3300. The movement, position, and orientation vectors can be represented as a series of coordinates. After detecting the motion of game controller 3300 in operation 3404, the procedure flows to operation 3406 wherein data representing the detected motion may be passed to the program which requested the data or may be otherwise receptive to the data.

In specific embodiments, the image or audio processing functions described above for determining the intensity value, controller player number, orientation and/or position of one or more input objects including controllers may be carried out in a process executing on a computer system. The computing system may be also executing a main process, which may be a gaming application, that requests or is otherwise receptive to the data generated from the image or audio processing, such data comprising the intensity value, controller player number, orientation and/or position of one or more input objects including controllers, controller actuation, etc. In various embodiments, the process performing the image and/or audio processing functions may be a driver for a video camera or video/audio monitoring device, the driver providing the data to the main process via any type of inter-process communication which may be implementation specific as generally known and understood in the art. The process performing image or audio processing executes on the same processor or a different processor as the one executing the gaming or other software. It may also be possible to have a common process for both image or audio processing and game functionality in the same process, e.g., using a procedure call. Therefore, while it may be stated herein that the intensity value or other information may be provided "to the program" it should be recognized that the invention encompasses providing such data to one routine of a process using a procedure call or other software function such that a single process can both perform image processing functionality as well as gaming functionality, as well as separating the functions into different processes whereby one or more processes, which may execute on a common processor core or multiple processor cores, perform image and/or audio processing as described herein and a separate process performs gaming functions.

The present invention may be used as presented herein or in combination with other user input mechanisms and notwithstanding mechanisms that track the angular direction of the sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as buttons, pressure pad, etc. that may influence the transmission or modulation of the same, encode state, and/or transmit commands from or to the device being tracked.

The invention may be practiced with other computer system configurations including game consoles, gaming computers or computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network. For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining an intensity value of an interaction with a computer program, the method including:
    capturing an image of a capture zone;
    identifying a representation of an input object in the image;
    identifying an initial value of a parameter of the input object, the parameter identifying one or more of a shape, color, or brightness of the input object, the parameter being affected by human manipulation of the input object;
    capturing a second image of the capture zone;
    identifying a second value of the parameter of the input object;
    determining an extent of change in the parameter, the extent of change being the difference between the second value and the first value; and
    providing an activity input to the computer program, the activity input including an intensity value representing the extent of change of the parameter;
    wherein the input object is an implement having a grip, the implement including illuminating means responsive to how tight the grip is squeezed, the parameter being one of a brightness or color of the illuminating means.

2. A method for determining an intensity value of an interaction with a computer program, the method comprising:

capturing an image of a capture zone;
identifying a representation of an input object in the image;
identifying an initial value of a parameter of the input object, the parameter identifying one or more of a shape, color, or brightness of the input object, the parameter being affected by human manipulation of the input object;
capturing a second image of the capture zone;
identifying a second value of the parameter of the input object;
determining an extent of change in the parameter, the extent of change being the difference between the second value and the first value; and
providing an activity input to the computer program, the activity input including an intensity value representing the extent of change of the parameter;
wherein the input object is a deformable object, the parameter representing an aspect ratio of the input object, the parameter being affected by squeezing the input object.

3. A method for determining an intensity value of an interaction with a computer program of claim 1, the method comprising:
capturing an image of a capture zone;
identifying a representation of an input object in the image;
identifying an initial value of a parameter of the input object, the parameter identifying one or more of a shape, color, or brightness of the input object, the parameter being affected by human manipulation of the input object;
capturing a second image of the capture zone;
identifying a second value of the parameter of the input object;
determining an extent of change in the parameter, the extent of change being the difference between the second value and the first value; and
providing an activity input to the computer program, the activity input including an intensity value representing the extent of change of the parameter;
wherein the input object is a deformable object comprising a material that changes color in response to being deformed, the parameter being a color of the object, the color being affected by squeezing the object.

4. The method of claim 1, wherein the implement is a toy gun, the grip includes a trigger, and the illuminating means is responsive to how tightly the trigger is squeezed.

5. A method for determining an intensity value of an interaction with a computer program, the method comprising:
capturing an image of a capture zone;
identifying a representation of an input object in the image;
identifying an initial value of a parameter of the input object, the parameter identifying one or more of a shape, color, or brightness of the input object, the parameter being affected by human manipulation of the input object;
capturing a second image of the capture zone;
identifying a second value of the parameter of the input object;
determining an extent of change in the parameter, the extent of change being the difference between the second value and the first value; and
providing an activity input to the computer program, the activity input including an intensity value representing the extent of change of the parameter;
wherein the input object is an implement having a grip, the implement including illuminating means comprising a plurality of illuminators, wherein the illuminating energizes a number of the illuminators in response to how tight the grip is squeezed, the illuminating means comprising a plurality of illuminators, the parameter being the number of illuminators that are energized.

6. The method of claim 5, wherein the implement is a toy gun, the grip includes a trigger, and the illuminating means is responsive to how tightly the trigger is squeezed.

7. A system for determining an intensity value of an interaction with a computer program, comprising:
an input object, the input object configured for human manipulation and for interaction with the computer program;
a monitoring device, the monitor capturing information comprising one of images or audio from a capture zone in a vicinity of the monitoring device;
a computing device configured to execute the computer program and interface with the input object and the monitoring device, the computer program receiving data representative of the information captured by the monitoring device, the computer program analyzing the data and calculating an intensity value representing an intensity of the human manipulation of the input object;
wherein the input object is an implement having a grip, the implement including illuminating means that changes brightness and/or color in response to how tight the grip is squeezed, wherein the monitoring device includes a video camera for capturing images of the input object, the intensity value representing one of a brightness or color of the illuminating means.

8. A system for determining an intensity value of an interaction with a computer program, comprising:
an input object, the input object configured for human manipulation and for interaction with the computer program; and
a monitoring device, the monitor capturing information comprising one of images or audio from a capture zone in a vicinity of the monitoring device;
a computing device configured to execute the computer program and interface with the input object and the monitoring device, the computer program receiving data representative of the information captured by the monitoring device, the computer program analyzing the data and calculating an intensity value representing an intensity of the human manipulation of the input object;
wherein the input object is a deformable object and the monitoring device includes a video camera for capturing images of the input object, the intensity value representing an aspect ratio of the input object, the aspect ratio being altered by squeezing the input object.

9. The system of claim 7, wherein the implement is a toy gun, the grip includes a trigger, and the illuminating means is responsive to how tightly the trigger is squeezed.

10. A system for determining an intensity value of an interaction with a computer program, comprising:
an input object, the input object configured for human manipulation and for interaction with the computer program;
a monitoring device, the monitor capturing information comprising one of images or audio from a capture zone in a vicinity of the monitoring device; and
a computing device configured to execute the computer program and interface with the input object and the monitoring device, the computer program receiving data representative of the information captured by the monitoring device, the computer program analyzing the data and calculating an intensity value representing an intensity of the human manipulation of the input object;

wherein the input object is an implement having a grip, the implement including illuminating means comprising a plurality of illuminators, wherein the illuminating energizes a number of the illuminators in response to how tight the grip is squeezed; and further wherein the monitoring device includes a video camera for capturing images of the input object, the intensity value representing the number of illuminators that are energized.

11. The system of claim 10, wherein the implement is a toy gun, the grip includes a trigger, and the illuminating means is responsive to how tightly the trigger is squeezed.

12. A system for determining an intensity value of an interaction with a computer program, comprising:
- an input object, the input object configured for human manipulation and for interaction with the computer program;
- a monitoring device, the monitor capturing information comprising one of images or audio from a capture zone in a vicinity of the monitoring device; and
- a computing device configured to execute the computer program and interface with the input object and the monitoring device, the computer program receiving data representative of the information captured by the monitoring device, the computer program analyzing the data and calculating an intensity value representing an intensity of the human manipulation of the input object;
- wherein the input object generates sound in response to the human manipulation, the sound having a changing parameter in response to the intensity of the human manipulation, the changing parameter comprising one of loudness, pitch, or rapidity, the monitoring device including a microphone for capturing the sound generated by the input object, the intensity value changing parameter.

13. A system for determining an intensity value of an interaction with a computer program, comprising:
- an input object, the input object configured for human manipulation and for interaction with the computer program;
- a monitoring device, the monitor capturing information comprising one of images or audio from a capture zone in a vicinity of the monitoring device; and
- a computing device configured to execute the computer program and interface with the input object and the monitoring device, the computer program receiving data representative of the information captured by the monitoring device, the computer program analyzing the data and calculating an intensity value representing an intensity of the human manipulation of the input object;
- wherein the computer program is one selected from a game, a communication system, an entertainment system, or an interactive application.

* * * * *